US011212133B2

(12) United States Patent
Suzuki et al.

(10) Patent No.: US 11,212,133 B2
(45) Date of Patent: Dec. 28, 2021

(54) DEVICE MANAGEMENT SYSTEM, DEVICE, AND DEVICE MANAGEMENT METHOD

(71) Applicant: PANASONIC INTELLECTUAL PROPERTY MANAGEMENT CO., LTD., Osaka (JP)

(72) Inventors: Junya Suzuki, Kyoto (JP); Shinya Nakai, Nara (JP); Mitsuki Yamada, Osaka (JP); Masayuki Kozuka, Osaka (JP); Kunio Gobara, Osaka (JP); Masaya Yamamoto, Kyoto (JP); Tomoki Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/638,439

(22) PCT Filed: Feb. 27, 2019

(86) PCT No.: PCT/JP2019/007583
§ 371 (c)(1),
(2) Date: Feb. 11, 2020

(87) PCT Pub. No.: WO2019/181405
PCT Pub. Date: Sep. 26, 2019

(65) Prior Publication Data
US 2020/0169429 A1 May 28, 2020

Related U.S. Application Data

(60) Provisional application No. 62/647,150, filed on Mar. 23, 2018.

(51) Int. Cl.
H04L 12/28 (2006.01)
H04L 29/08 (2006.01)

(52) U.S. Cl.
CPC ........ *H04L 12/2825* (2013.01); *H04L 67/125* (2013.01); *H04L 2012/285* (2013.01); *H04L 2012/2841* (2013.01)

(58) Field of Classification Search
CPC ............... H04L 12/2825; H04L 67/125; H04L 2012/2841; H04L 2012/285
(Continued)

(56) References Cited

U.S. PATENT DOCUMENTS

2006/0242285 A1    10/2006  Moriwaki
2013/0020871 A1*    1/2013  Takehara .................. H02J 3/14
                                                              307/32
(Continued)

FOREIGN PATENT DOCUMENTS

JP      2004-200755 A      7/2004
JP      2013-090125 A      5/2013
(Continued)

OTHER PUBLICATIONS

Yoichi Enomoto, et al., "Outline of Low Power Wide Area (LPWA) Network Technology for Enabling IoT", Japan Railway Engineer's Association, vol. 61, No. 3, pp. 32â€"35, Mar. 1, 2018, with partial English translation.
(Continued)

*Primary Examiner* — Tan Doan
(74) *Attorney, Agent, or Firm* — McDermott Will and Emery LLP

(57) ABSTRACT

A device management system includes: a server communicatively connected to a network; a base station for long-distance wireless communication that is communicatively connected to the network; and a device that is communicatively connected to the base station and transmits, to the server via the base station, state information indicating a state of the device. The server receives the state information
(Continued)

from the device, generates notification information in accordance with the received state information, and transmits the generated notification information to the device.

10 Claims, 28 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2014/0229433 A1 | 8/2014 | Nakajima et al. | |
| 2018/0288093 A1* | 10/2018 | Kato | H04L 67/2871 |
| 2018/0352310 A1* | 12/2018 | Bonicatto | H04Q 9/02 |

FOREIGN PATENT DOCUMENTS

| | | |
|---|---|---|
| JP | 2016-063520 A | 4/2016 |
| JP | 2017-084174 A | 5/2017 |
| WO | 2016/024556 | 2/2016 |
| WO | 2017/004681 A1 | 1/2017 |

OTHER PUBLICATIONS

International Search Report and Written Opinion, dated May 21, 2019 in International Application No. PCT/JP2019/007583; with partial English translation.
Extended European Search Report dated Apr. 13, 2021, in the corresponding European Patent Application No. 19770896.9.

* cited by examiner

FIG. 6
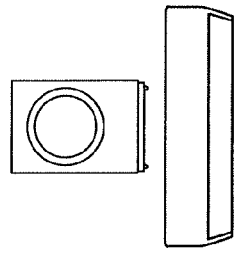
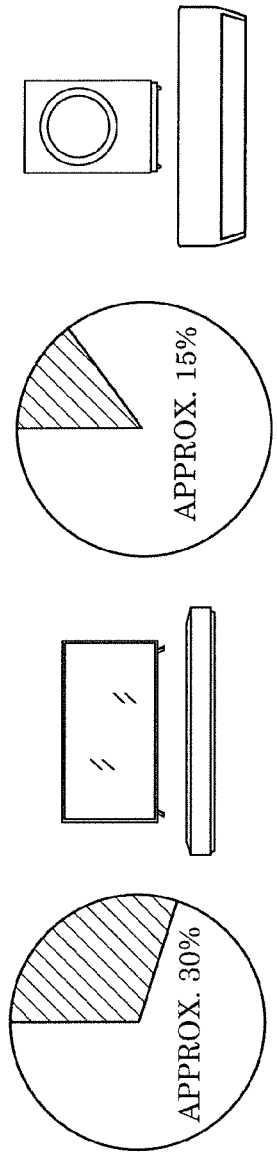

FIG. 8

|  | Wi-Fi | LoRa | NB-IoT | CAT.M1 |
|---|---|---|---|---|
| TYPE | NOT GUARANTEED TO BE ALWAYS CONNECTED | ALWAYS CONNECTED THROUGH NON-CELLULAR NETWORK | ALWAYS CONNECTED THROUGH CELLULAR NETWORK | |
| RADIO LICENSING | NOT REQUIRED (USES LICENSE-FREE BAND) | NOT REQUIRED (USES LICENSE-FREE BAND) | REQUIRED (CARRIER EXCLUSIVE) | |
| BASE STATION OPERATION | HOME GW PLACED BY CUSTOMER | MOBILE CARRIER/SELF-OPERATED | MOBILE CARRIER | |
| RADIO USAGE FEE | NOT REQUIRED | NOT REQUIRED | REQUIRED | |
| DEVICE COMMUNICATION FEE | PER-HOUSEHOLD LUMP SUM | LOW | APPROX. 20 TIMES HIGHER THAN LoRa | APPROX. 50 TIMES HIGHER THAN LoRa |
| COMMUNICATION STABILITY | UNSTABLE | UNSTABLE | GUARANTEED TO AN EXTENT BY CARRIER | |
| COMMUNICATION SPEED | VERY FAST | SLOW | SLOW | MEDIUM TO FAST |
| COMMUNICATION DATA VOLUME | EXCEEDINGLY HIGH | LOW | LOW | RATHER HIGH |
| COMMUNICATION DISTANCE | INSIDE HOME | APPROX. 1–20 km | APPROX. 1–20 km | APPROX. 1–10 km |
| NETWORK CONGESTION TOLERANCE | LOW | LOW | HIGH | |
| EVALUATION | ·COMMUNICATION COST PAID BY CUSTOMER ·FAST AND BROAD, BUT UNSTABLE COMMUNICATION CHANNEL ·RISK OF NOT BEING ABLE TO CONNECT | ·COSTS ARE EXCEEDINGLY LOW HOWEVER, COMMUNICATION CHANNEL IS SLOW AND NARROW | ·HAS OPERATION COSTS ·COMMUNICATION CHANNEL IS SLOW, BUT STABLE | ·OPERATIONS COSTS ARE HIGH ·STABLE COMMUNICATION CHANNEL WITH ADEQUATE SPEED AND DATA VOLUME |

FIG. 19

| ITEMS | CONTENT EXAMPLE |
|---|---|
| MANUFACTURING PLANT | ID OF BASE STATION USED TO ESTABLISH INITIAL COMMUNICATION |
| MANUFACTURE DATE AND TIME | DATE AND TIME OF ESTABLISHMENT OF INITIAL COMMUNICATION |
| REPAIR SHOP | ID OF BASE STATION USED TO ESTABLISH FIRST COMMUNICATION AFTER REPAIR |
| REPAIR DATE AND TIME | DATE AND TIME OF ESTABLISHMENT OF FIRST COMMUNICATION AFTER REPAIR |

DEVICE MANAGEMENT SYSTEM, DEVICE, AND DEVICE MANAGEMENT METHOD

CROSS-REFERENCE OF RELATED APPLICATIONS

This application is the U.S. National Phase under 35 U.S.C. § 371 of International Patent Application No. PCT/JP2019/007583, filed on Feb. 27, 2019, which in turn claims the benefit of U.S. Provisional Application No. 62/647,150, filed on Mar. 23, 2018, the entire disclosures of which Applications are incorporated by reference herein.

TECHNICAL FIELD

The present disclosure relates to a device management system, a device, and a device management method.

BACKGROUND ART

Recent years have seen household appliances (also referred to as devices) that connect, over a network, to an appliance control cloud (also referred to as a control cloud), which is a cloud for controlling the appliances, and operate under control by the control cloud (see Patent Literature (PTL) 1).

CITATION LIST

Patent Literature

PTL 1: Japanese Unexamined Patent Application Publication No. 2016-63520

SUMMARY OF THE INVENTION

Technical Problem

However, a user of such a device does not necessarily, for example, configure settings for connecting to a network and connect the device to the control cloud. If the device is not connected to the control cloud, the device cannot be efficiently managed by the control cloud.

In view of this, the present disclosure provides a device management system and the like, which can efficiently manage a device.

Solution to Problem

A device management system according to one aspect of the present disclosure includes: a server communicatively connected to a network; a base station for long-distance wireless communication that is communicatively connected to the network; and a device that is communicatively connected to the base station and transmits state information indicating a state of the device to the server via the base station.

These general and specific aspects may be implemented using a device, a method, an integrated circuit, a computer program, or a computer-readable recording medium such as a CD-ROM, or any combination thereof.

Advantageous Effect of Invention

The device management system according to the present disclosure can efficiently manage a device.

BRIEF DESCRIPTION OF DRAWINGS

FIG. 6 is a diagram illustrating a network connection rate of appliances with a built-in network function.

FIG. 8 is a table illustrating characteristics of communication methods (Wi-Fi, LPWA) that can be used by always-connected IoT household appliances.

FIG. 19 is a table illustrating one example of the state information that is transmitted to a server by devices at the time of manufacture or repair.

DESCRIPTION OF EXEMPLARY EMBODIMENT

Figure 1:
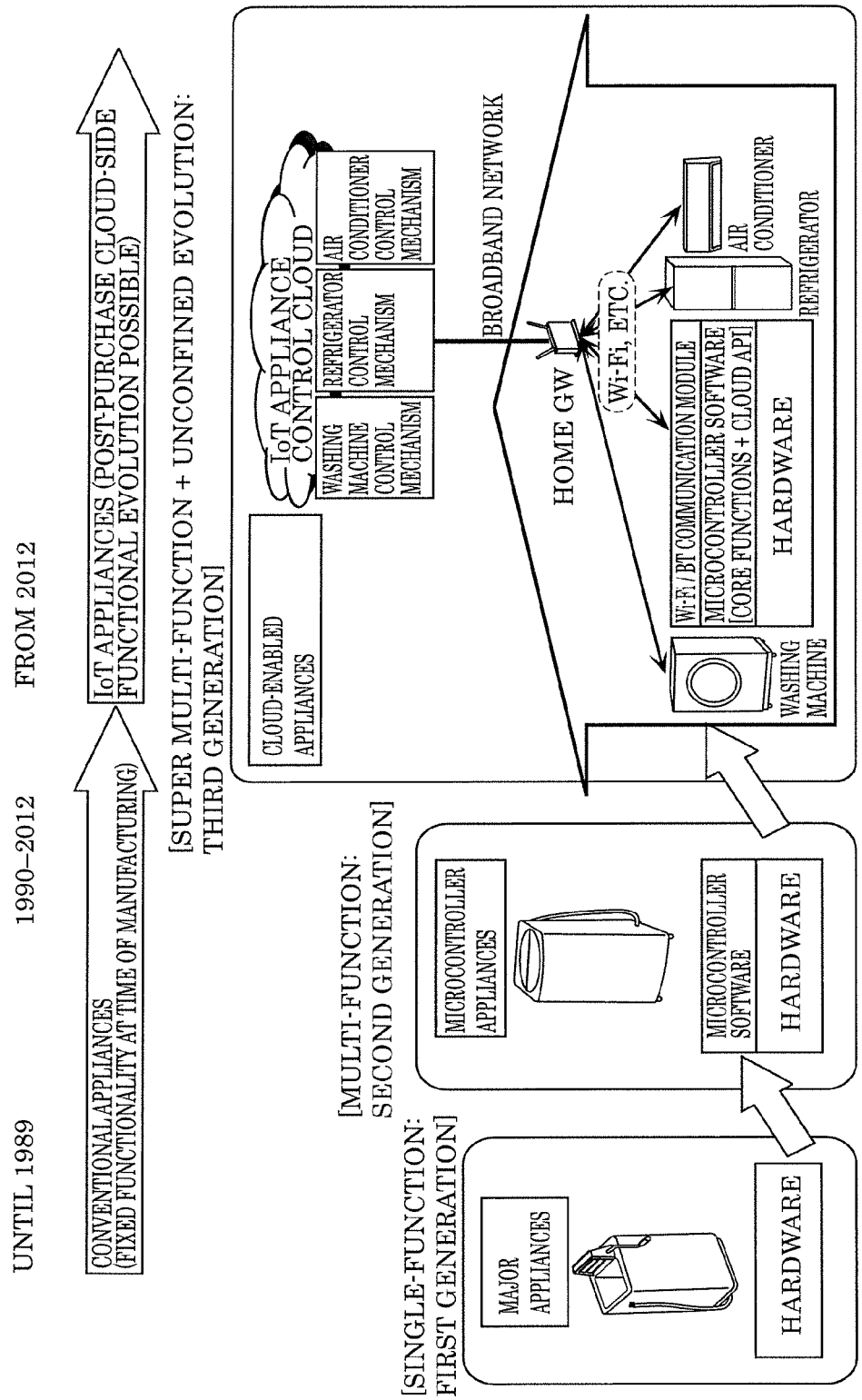
FIG. 1 is a diagram illustrating the evolution of household appliances.

A device management system according to one aspect of the present disclosure includes: a server communicatively connected to a network; a base station for long-distance wireless communication that is communicatively connected to the network; and a device that is communicatively connected to the base station and transmits state information indicating a state of the device to the server via the base station.

With this, the device can transmit state information of the device to the server at regular intervals, for example. Accordingly, the server can obtain the most recent state information for devices, and can thus efficiently manage devices.

Moreover, the device may include: a communication module for carrying out the long-distance wireless communication with the base station; and a communications battery that supplies power for operating the communication module, to the communication module. The communication module may transmit the state information to the server via the base station when the device is powered-off.

Accordingly, since the communication module can communicate with the base station even when the device is powered-off, the communication module can transmit the state information of the device to the server.

Moreover, the device may further include: a controller that controls operation of the device when the device is powered-on; and a storage that sequentially stores a control state indicating control carried out by the controller. When the device is powered-off, the communication module may read the control state sequentially stored in the storage, and transmit the control state read to the server via the base station, as the state information.

Accordingly, the communication module can transmit the control state of the device to the server as state information, even when the device is powered-off.

Moreover, the base station may be a low power, wide area (LPWA) base station, and the communication module may be an LPWA communication module.

With this, the device can transmit the power state of the device to the server.

Moreover, the state information may include a power state indicating whether the device is energized or not.

With this, the device can easily realize a state in which it is always connected to a network, the device can regularly transmit the state information of the device to the server.

Moreover, the server may receive the state information from the device, generate notification information in accordance with the state information received, and transmit the notification information generated to the device.

With this, the server can transmit notification information appropriate for the state of the device, to the device.

Moreover, a device may include a communication module communicatively connected to a base station for long-distance wireless communication, the communication module configured to transmit state information indicating a state of the device to a server via the base station, the server communicatively connected to the base station via a network.

With this, the device can transmit state information of the device to the server at regular intervals, for example.

Moreover, the device may further include a communications battery that supplies power for operating the communication module, to the communication module. The communication module transmits the state information to the server via the base station when the device is powered-off.

Accordingly, since the communication module can communicate with the base station even when the device is powered-off, the communication module can transmit the state information of the device to the server.

Moreover, the device may further include: a controller that controls operation of the device when the device is powered-on; and a storage that sequentially stores a control state indicating control carried out by the controller. When the device is powered-off, the communication module reads the control state sequentially stored in the storage, and transmits the control state read to the server via the base station, as the state information.

Accordingly, the communication module can transmit the control state of the device to the server as state information, even when the device is powered-off.

Moreover, the base station may be a low power, wide area (LPWA) base station, and the communication module may be an LPWA communication module.

With this, the device can transmit the power state of the device to the server.

Moreover, the state information may include a power state indicating whether the device is energized or not.

With this, the device can easily realize a state in which it is always connected to a network, the device can regularly transmit the state information of the device to the server.

These general and specific aspects may be implemented using a method, an integrated circuit, a computer program, or a computer-readable recording medium such as a CD-ROM, or any combination thereof.

Hereinafter, a non-limiting embodiment will be described in detail with reference to the accompanying drawings. However, unnecessarily detailed descriptions may be omitted. For example, detailed descriptions of well-known matters or descriptions of components that are substantially the same as components described previous thereto may be omitted. This is to avoid unnecessary redundancy and provide easily read descriptions for those skilled in the art.

Note that the inventor(s) have provided the accompanying drawings and subsequent descriptions to facilitate sufficient understanding of the present disclosure by those skilled in the art, and are thus not intended to limit the scope of the subject matter recited in the claims.

Hereinafter, first, underlying knowledge forming the basis of the present invention and technical problems to be overcome by the invention will be described in greater detail, followed by description of an exemplary embodiment.

(Underlying Knowledge Forming the Basis of the Present Invention)

FIG. 1 is a diagram illustrating the evolution of household appliances.

More specifically, FIG. 1 illustrates the evolution of the architecture of household appliances (for example: major appliances such as washing machines and refrigerators; air conditioners; and humidifying air purifiers).

The first generation (before 1990) of household appliances were single-function products, as the hardware, such as the compressors and motors, was implemented through control logic made with large-scale integrated (LSI) circuits.

The second generation (from 1990 to around 2010) of household appliances were equipped with microcontrollers. Complex control of these household appliances was possible due to the implementation of microcontrollers and the creation of software for the microcontrollers. This made multi-function appliances a reality. However, after shipment of the appliances, it was not possible to change or add functions by changing the microcontrollers.

The third generation (from 2012 and on) of appliances are cloud-enabled appliances equipped with communication functionality, such as Wi-Fi (registered trademark) and/or Bluetooth (registered trademark; hereinafter referred to as "BT"), which allows them to connect to an Internet of Things (IoT) appliance control cloud through a home gateway (GW) and a broadband network. Accordingly, even after shipment of the appliances, the software for the microcontrollers in the appliances can be updated from the cloud. Moreover, even after shipment, functions can be added or changed by updating the control mechanism for the appliance cloud-side, without updating the microcontroller software. As used herein, an "IoT appliance control cloud" is a cloud (aggregate of a server and a network) that controls appliances through a communication channel such as a broadband network, and is one example of a cloud-based service.

Figure 2:
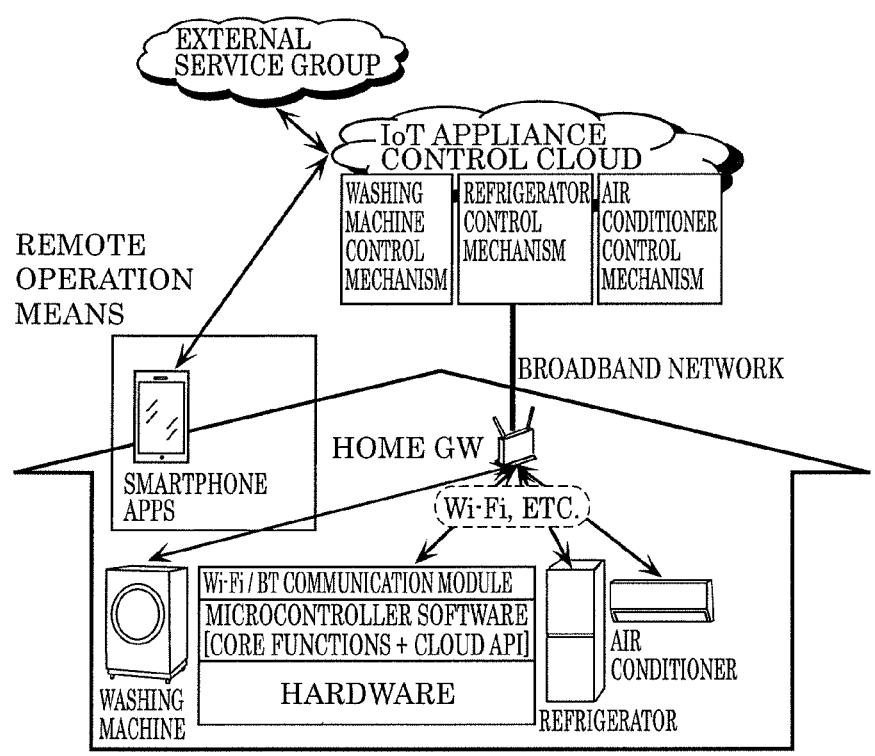
FIG. 2 is a diagram illustrating an example of third generation household appliance architecture and external service linkage.

FIG. 2 is a diagram illustrating an example of third generation household appliance architecture and external service linkage.

With third generation cloud-enabled household appliances (major appliances such as washing machines and refrigerators; air conditioners; and humidifiers), it is possible to access each household appliance in a household from smartphone applications (apps) via each household appliance control mechanism in the IoT appliance control cloud.

Accordingly, it is possible to remotely monitor the operation state and remotely control operations (e.g., turn on, stop, adjust temperature, dispense detergent, etc.) of each household appliance using smartphone apps. By linking an external service group such as an e-commerce service cloud or monitoring service cloud, and each household appliance control mechanism in the IoT appliance control cloud, it is possible to control household appliances through various types of cloud services, or retrieve operation information (logs, etc.) of household appliances and use this information in external services.

Figure 3:
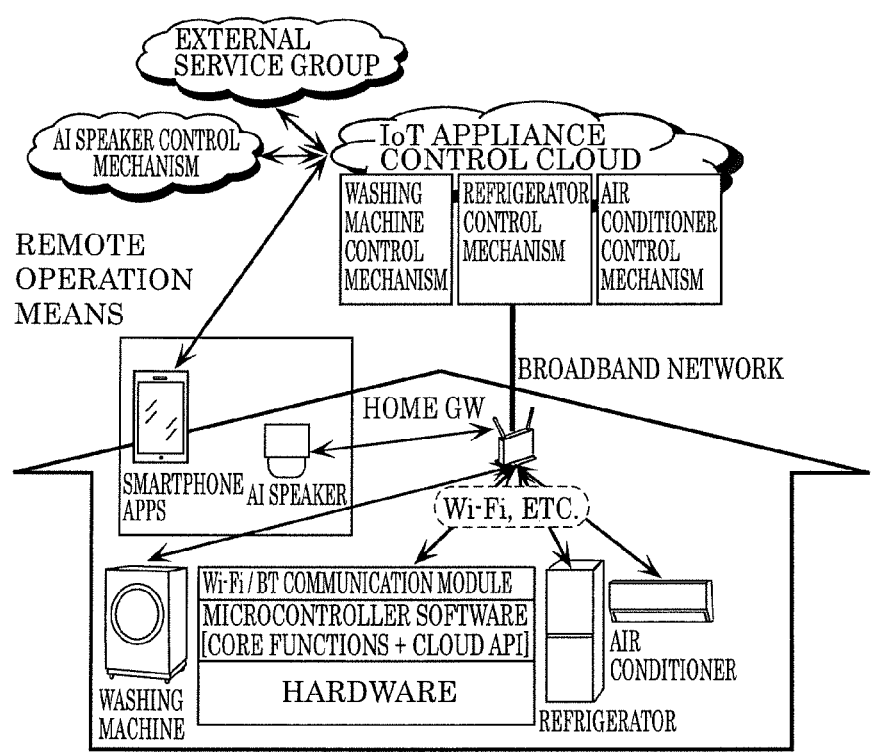
FIG. 3 is a diagram illustrating an example of third generation household appliance architecture and AI speaker linkage.

FIG. 3 is a diagram illustrating an example of third generation household appliance architecture and artificial intelligence (AI) speaker linkage.

With third generation cloud-enabled household appliances (major appliances such as washing machines and refrigerators; air conditioners; and humidifiers), it is possible for a user to remotely control each household appliance from an AI speaker through voice interaction by accessing an AI speaker control mechanism in a cloud from a voice-interactive AI speaker via a home GW, and this AI speaker control mechanism accessing each household appliance control mechanism.

(Technical Problems to be Solved)

Figure 4:
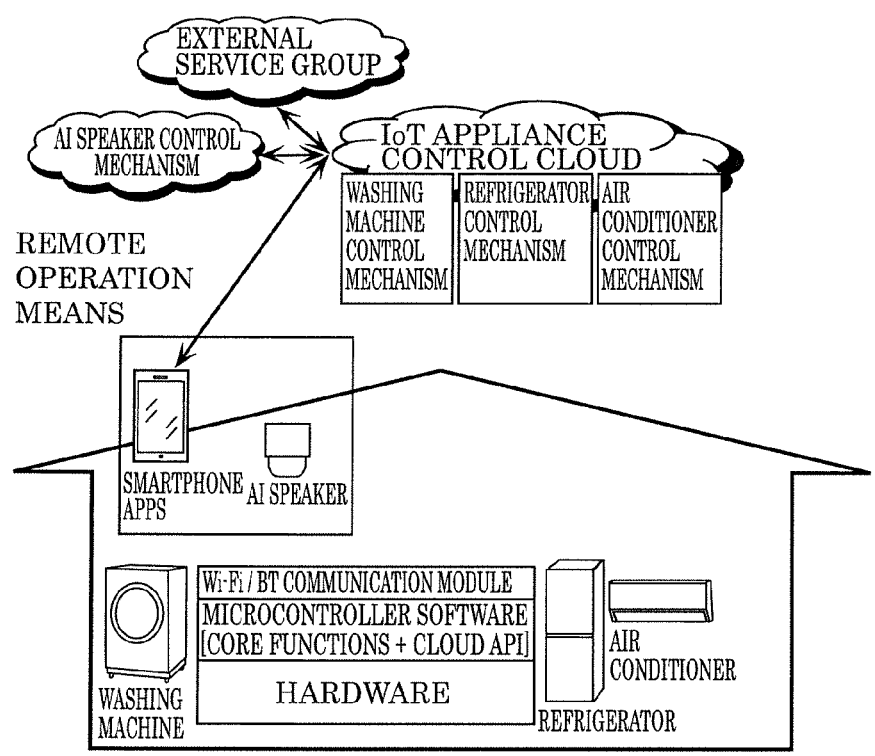
FIG. 4 is a diagram illustrating a first technical problem of third generation household appliances.

FIG. 4 is a diagram illustrating a first technical problem of third generation household appliances. The first technical problem is that it is not possible to use some functions of third generation appliances in a household without a Wi-Fi GW.

If a household does not have a home GW such as a Wi-Fi home GW and thus cannot connect to a broadband network, even if such a household purchases a third generation cloud-enabled household appliance (a major appliance such as a washing machine or a refrigerator; an air conditioner; or a humidifier), the cloud-enabled appliance cannot connect to an IoT appliance control cloud. In such cases, since the appliance cannot be accessed from the IoT appliance control cloud, it is not possible to achieve the objective set by third generation household appliances of increasing the value added to a product by post-purchase cloud-side functional advancements. Thus, in such cases, despite being an IoT appliance, the third generation household appliance can only be used as a conventional second generation household appliance (microcontroller household appliance) characterized by fixed functionality that is fixed at the time of manufacturing.

Figure 5:
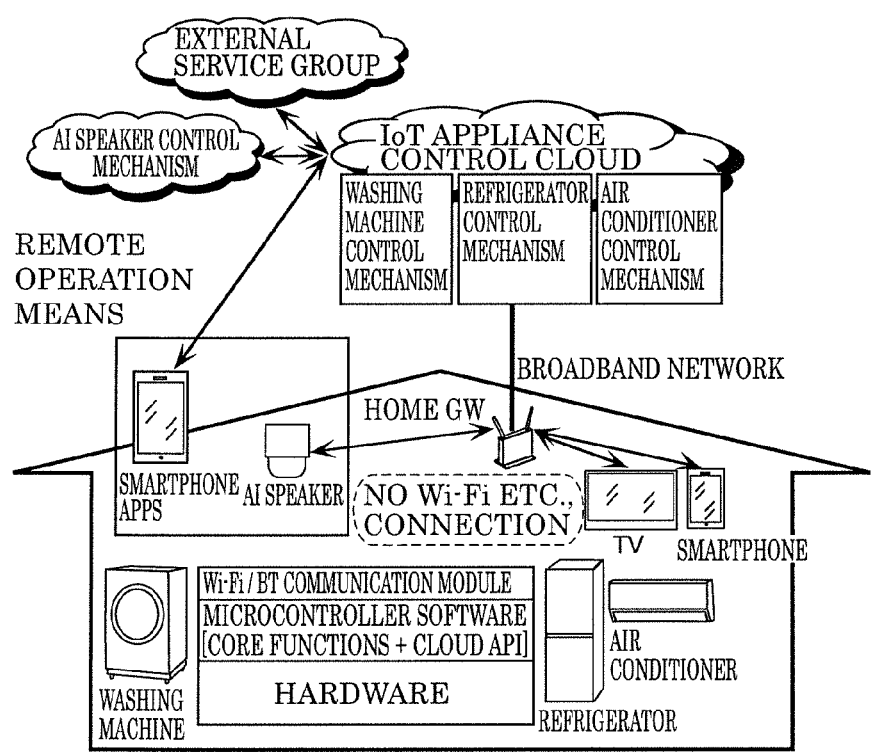
FIG. 5 is a diagram illustrating a second technical problem of third generation household appliances.

FIG. 5 is a diagram illustrating a second technical problem of third generation household appliances. The second technical problem is that despite having a Wi-Fi GW in their household, users do not connect third generation household appliances to their household Wi-Fi GW.

When information devices such as smartphones, tablets, and PCs, or AI speakers are not equipped with a function for connecting to the internet via, for example, Wi-Fi, the user is not capable of using the desired original functionality of these products. Some smartphones or AI speakers cannot even be used without connecting to the Internet and configuring user information (mail address, account, etc.). Since the user has purchased the device precisely because they want to use the functions thereof, the user will undoubtedly configure the user ID settings and/or Wi-Fi settings and connect the device to the internet.

In regard to smart TVs, as video streaming services such as Youtube, Netflix, Amazon Prime Video, etc., are becoming increasingly popular, users (or installers) often configure the Wi-Fi settings in order to be able to watch the video programming provided by such services on a large-screen TV.

In regard to cloud-enabled household appliances, users often do not initially configure the internet connections settings because they have configured tedious Wi-Fi settings and found the available internet services difficult to understand, or because they do not value the internet services enough to consider them to be an indispensable function.

Another common scenario is when the user configures the Wi-Fi settings immediately after purchasing a cloud-enabled household appliance, but finds the user friendliness of the internet services to be relatively low, and thus chooses to disconnect the appliance despite taking the time to initially connect it, or chooses not to reconnect the appliance after it happens to disconnect.

Therefore, it is possible to develop various types of cloud services for information devices and AI speakers with the assumption that they are connected to the internet, since it is possible to expect a connection rate of approximately 100%, but a connection rate of 100% cannot be expected for TVs or household appliances.

FIG. 6 is a diagram illustrating a network connection rate of appliances with a built-in network function (audiovisual (AV) appliances and household appliances).

The above-mentioned cloud-enabled household appliances are capable of providing customer value that microcontroller household appliances do not provide, by connecting to an IoT appliance control cloud and using various types of cloud services, due to the cloud-based household appliance being equipped with a means of communication such as Wi-Fi or Bluetooth. Thus, it is possible to improve customer satisfaction, since it is possible to provide customer value that outweighs the increase in cost resulting from equipping cloud-enabled household appliances with a means of communication such as Wi-Fi.

However, a technical problem of the above-mentioned means of communication is that, in most cases such as those as described below, the user possessing the device forgoes configuring the settings, that is to say, a cloud-enabled household appliance that is not connected to the cloud is only capable of providing the same customer value as a microcontroller household appliance.

(1) In order to connect to Wi-Fi, the user needs to prepare a Wi-Fi access point in their home. However, users that only connect to the internet from their smartphone, that is to say, users that only use a communication network provided by a telecommunications carrier may not have a Wi-Fi access point in their home.

(2) Even when there is a Wi-Fi access point in the user's home, it is difficult to say that every person is capable of easily configuring the settings for connecting to Wi-Fi, due to the complexity of the connection settings of home appliances, e.g., a connection process starting off with inputting a password.

The network connection rate of cloud-enabled TVs or cloud-enabled household appliances on the Japanese market in 2017, as illustrated in FIG. 6, did not exceed 50%, meaning that many users actually used their cloud-enabled household appliances as microcontroller household appliances.

Figure 7:
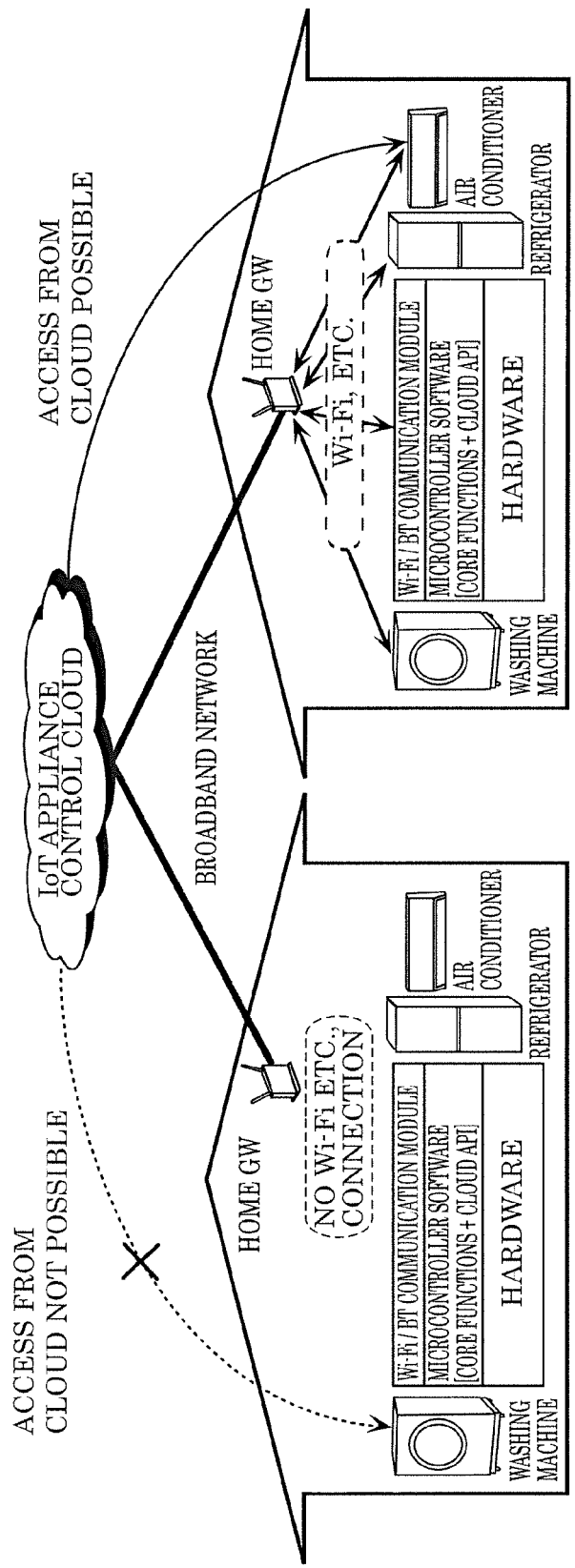
FIG. 7 is a diagram illustrating network connectivity, etc., for cloud-enabled household appliances.

FIG. 7 is a diagram illustrating network connectivity, etc., for cloud-enabled household appliances.

When a cloud-enabled household appliance is not connected to a cloud, it is not possible to access the cloud-enabled household appliance from an IoT appliance control cloud. Thus, it is not possible to enjoy the functions that increase the value added to a product by post-purchase cloud-side functional advancements, which is possible with cloud-enabled household appliances.

Therefore, despite being cloud-enabled household appliances, only those functions that are equivalent to conventional microcontroller household appliances characterized by fixed functionality that is fixed at the time of manufacturing can be used.

Cloud household appliances are originally designed to be able to take action in case of a recall, such as instructing an emergency stop of operation, remotely updating firmware, or sending a notification email to the user of the recalled appliance. However, in the current situation in which connection rates are low, manufacturers are often not capable of utilizing such functions to control cloud-enabled household appliances from these IoT appliance control clouds. Thus, with respect to all applicable cloud-enabled household appliances, functionality such as remote maintenance or recall notifications that can be implemented when remote monitoring and controlling is possible, is not sufficiently implemented.

Even in these times in which it is difficult in practice to have cloud-enabled household appliances equipped with Wi-Fi or BT communication means or the like be connected to a cloud, various other means of communication for making sensors and devices other than appliances IoT-compatible have become available.

In particular, the wireless means of communication developed for IoT applications known as low-power wide-area (LPWA) has come into practical use and is receiving attention as a communication method suitable for the IoT era.

A characteristic of LPWA wireless technology is that, compared to Long-Term Evolution (LTE), it is possible to reduce the cost of both wireless circuits and infrastructure, since it is possible to (i) reduce terminal costs through small-scale semiconductor packaging, and (ii) reduce the number of base stations by using low-rate modulation that yields an exceedingly long communication distance (up to 10 km). On the other hand, since LPWA uses a method that reduces transfer rates to improve reception sensitivity, the volume of data that can be transferred is low.

By equipping appliances with LPWA wireless technology, users are no longer required to sign up for an internet connection, appliances are directly connected to base stations, and it may be possible to greatly reduce the cost of services connected to a cloud server.

LPWA is divided into cellular LPWA and non-cellular LPWA. Cellular LPWA is provided as one cellular line (such as LTE), using a frequency band assigned by a cellular carrier (licensed band).

Non-cellular LPWA uses LPWA wireless technology by taking advantage of the fact that channel usage fees are no longer necessary when using non-licensed bands that exist in each country. Since non-licensed bands are shared between other wireless systems, restrictions preventing the channels from being monopolized are stipulated in each country's radio regulations.

Representative LPWA methods will be described below.

FIG. 8 is a table illustrating characteristics of communication methods (Wi-Fi, LPWA) that can be used by always-connected IoT household appliances.

(1) Cellular LPWA (1-1) NB-IoT

NB-IoT has its origin in GSM (registered trademark) (2G), adopts the advantages of low transfer rates and LTE communication sequences, and is dedicated to data transfer for IoT applications. By having the same channel spacing as GSM of 200 kHz, switching to operating on a GSM channel is made easy. Sensitivity is improved by having a low uplink transmission peak rate of 62.5 kbps, and receiving and storing data through repeated transmission (64 times). The maximum link budget is high at 130 dB. By limiting transmission power to 100 mW (GSM's transmission power is 2 W), it is possible to limit peak current and use NB-IoT with a single battery.

(1-2) LTE-M (CAT-M)

LTE-M (CAT-M) has its origin in LTE (4G), and performs communication using the smallest channel spacing of LTE (1.4 MHz). Since this standard is based on the slot configuration of LTE, it is possible to use the standard together with conventional LTE communication slots. Sensitivity is improved by a low uplink transmission peak rate of 1 Mbps, and receiving and storing data through repeated transmission. The maximum link budget is 130 dB.

Since transfer rates are rather high, power consumption when battery-driven is at a minimum. Transmission power is 200 mW.

(2) Non-Cellular LPWA (2-1) LoRa

LoRa uses conventional low-power wireless bands (ISM bands), but reception sensitivity is improved through ultra-low-rate modulation. Ultra-low-rate modulation is implemented by using a special spread-spectrum modulation called LoRa chirp modulation. Characteristics of LoRa chirp modulation are a low transfer rate of 250 bps, a spread bandwidth of 125 kHz, and a high sensitivity strong against interfering noise. Moreover, communication capacity is improved as it is possible to select multiple data rates in the same bandwidth and simultaneously receive this data on the same channel. The maximum link budget is 149 dB. Transmission power is 20 mW.

LoRa retains the characteristics of conventional low-power wireless technology (low power and low-current peaks), making it possible to operate with one battery for ten years or with a coin cell.

Specifications have been standardized through the LoRa Alliance, making interconnection between operators possible.

(2-2) SIGFOX

SIGFOX uses conventional low-power wireless bands (ISM bands), but reception sensitivity is improved through ultra-low-rate modulation. Ultra-low-rate modulation is implemented through narrowband FSK, and the problem of frequency error is overcome through base-station-side digital demodulation processing. SIGFOX modulation has a fixed uplink rate of 100 bps and a fixed downlink rate of 600 bps. The influence of interfering noise is avoided through multiple transmissions on different frequencies. Due to the fixed rates and simultaneous multiple receptions not being possible, communication capacity is relatively small. The maximum link budget is 158 dB. Transmission power is 20 mW.

SIGFOX retains the characteristics of conventional low-power wireless technology (low power and low-current peaks), making it possible to operate with one battery for ten years or with a coin cell.

SIGFOX has proprietary specifications, and its base stations are monopolized by SIGFOX1.

Since SIGFOX only allows one-way communication, it can be used for IoT sensors, but it is not suitable for IoT household appliances.

As illustrated in FIG. 8, a combination of LPWA and Wi-Fi technologies is considered to be appropriate for making always-connected IoT household appliances a reality. However, due to the three LPWA methods described above having different characteristics, cost increases when communication quality is prioritized, and conversely when cost is prioritized, communication quality is poor, risking the inability to ensure stable communication. Accordingly, it is difficult to select a single LPWA method for always-connected IoT appliances.

Embodiment

Hereinafter, devices capable of connecting to a control cloud and being controlled accordingly will be described.

Figure 9:
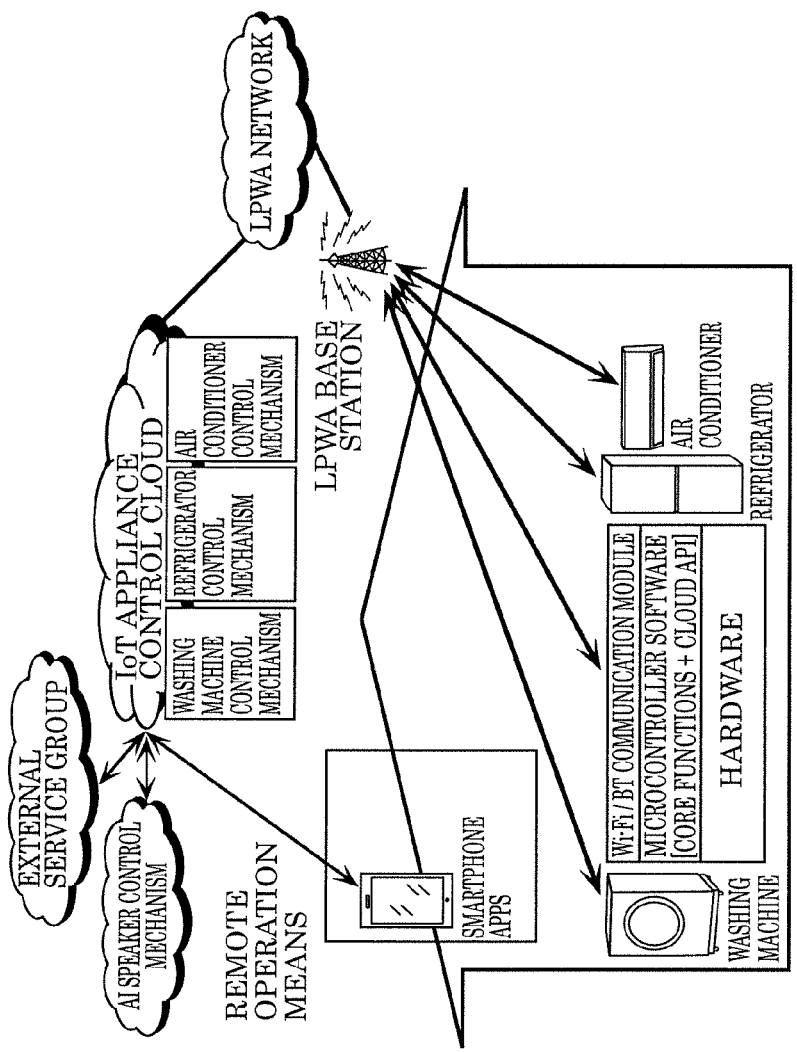
FIG. 9 is a first diagram illustrating fourth generation household appliance (always-connected IoT appliance) architecture and external service linkage.

FIG. 9 is a first diagram illustrating fourth generation household appliance (always-connected IoT appliance) architecture and external service linkage. Household appliances include, for example, major appliances such as washing machines and refrigerators, as well as air conditioners and humidifying air purifiers, and are also simply referred to as devices.

In order to overcome the technical problems associated with third generation household appliances, it was necessary for all users of household appliances to have a Wi-Fi GW, necessary to develop services that incentivized users to connect their household appliances to the internet and continue to use the services, and necessary to make Wi-Fi settings easy to configure.

However, with the emergence of various means of communication in recent years, the means of communication known as low-power wide-area (LPWA) is being advocated and garnering attention because of its capability to connect appliances to a cloud more easily than before.

LPWA is characterized by being usable without requiring users to configure any settings, an exceedingly long communication distance (up to 10 km), and invariable connectivity to a base station as long as the device has reception.

With fourth generation household appliances (always-connected IoT appliances), equipping the household appliances with LPWA technology makes cloud connection and post-purchase cloud-side expansion of functionality possible without requiring the user to have a Wi-Fi GW and configure tedious Wi-Fi settings.

Figure 10:
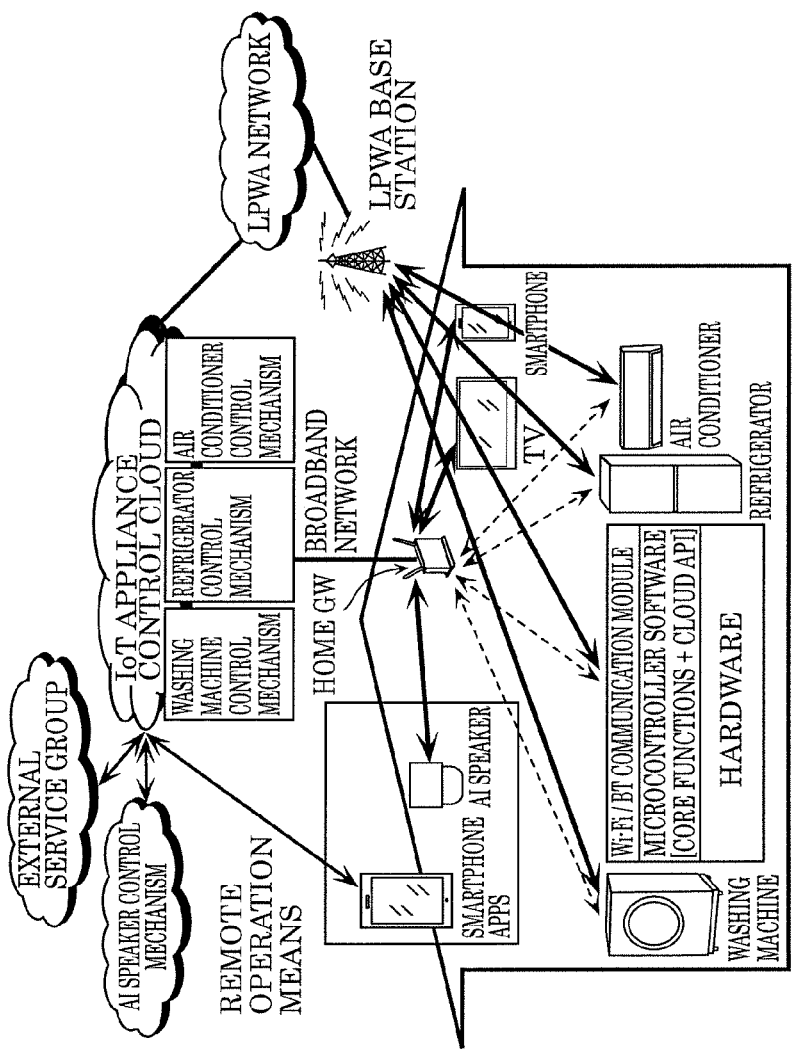
FIG. 10 is a second diagram illustrating fourth generation household appliance architecture and external service linkage.

FIG. 10 is a second diagram illustrating fourth generation household appliance architecture and external service linkage.

While LPWA has the outstanding features stated above, the volume of data that can be transferred is low compared to Wi-Fi or LTE or the like, since it utilizes a method that reduces transfer rates to improve reception sensitivity. Thus, in fourth generation household appliances (hereinafter also referred to as "always-connected IoT appliances"), using the Wi-Fi technology found in third generation household appliances along with LPWA technology enables application-appropriate communication.

Figure 11:
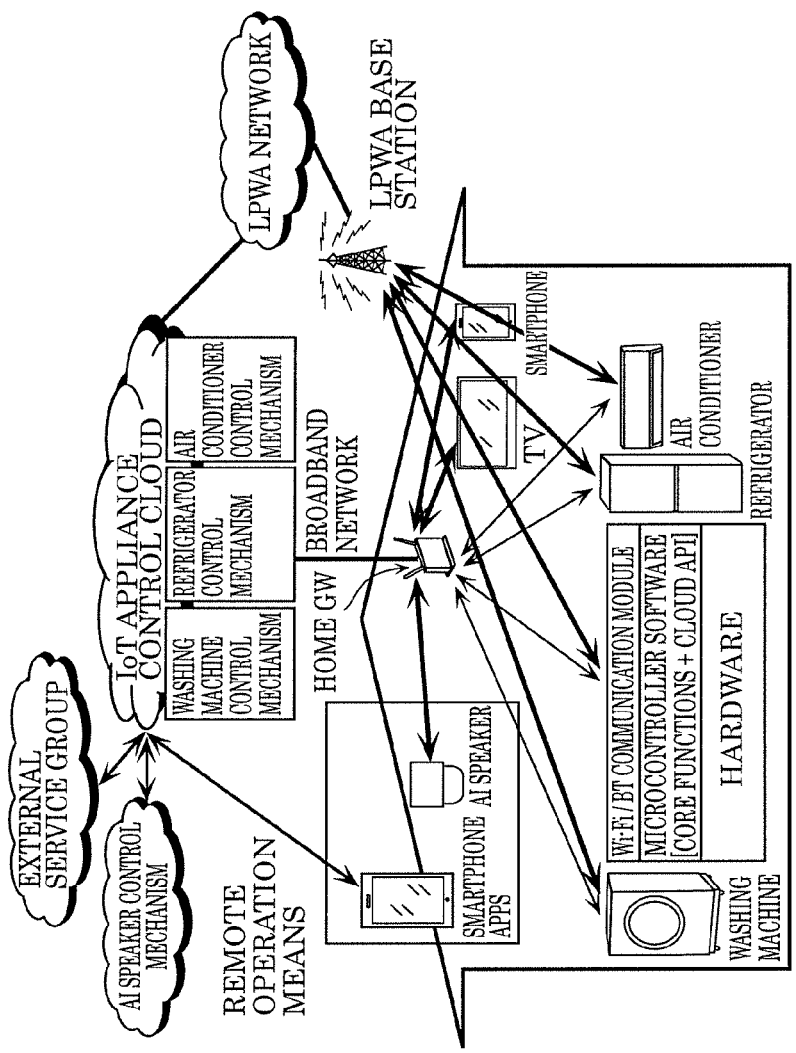
FIG. 11 is a third diagram illustrating fourth generation household appliance architecture and external service linkage.

FIG. 11 is a third diagram illustrating fourth generation household appliance architecture and external service linkage.

With regard to compelling users to configure tedious Wi-Fi settings, which was one major technical problem associated with third generation household appliances, the process of configuring Wi-Fi settings can be simplified by using LPWA, as shown via the following examples.

(1) If the Wi-Fi settings are input into a cloud, fourth generation household appliances (always-connected IoT appliances) will use LPWA to obtain the Wi-Fi settings from the cloud and connect to a Wi-Fi GW.

(2) If the Wi-Fi settings are input into a single fourth generation household appliance, the appliance will transmit the Wi-Fi settings to other devices in the home via LPWA, and the other devices will use those settings to connect to the Wi-Fi GW.

Figure 12:
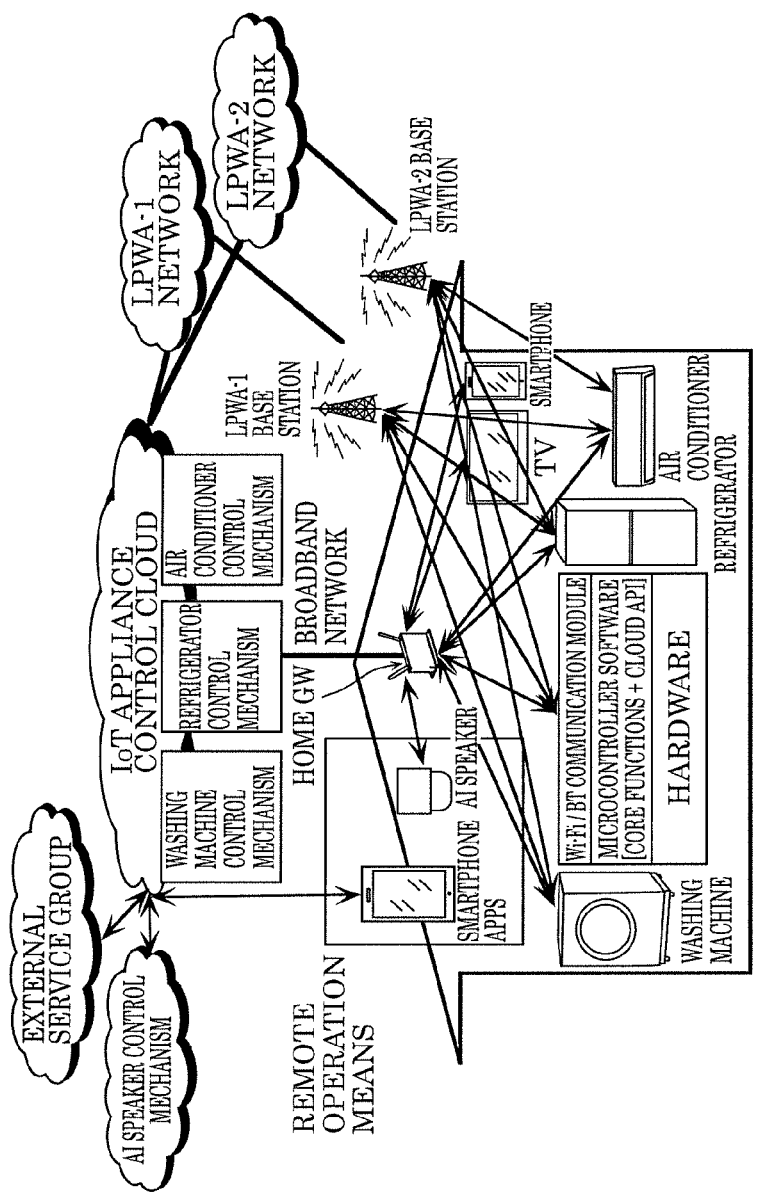
FIG. 12 is fourth third diagram illustrating fourth generation household appliance architecture and external service linkage.

FIG. 12 is fourth third diagram illustrating fourth generation household appliance architecture and external service linkage.

The problem with LPWA described above, namely that the volume of data that can be transferred is low compared to Wi-Fi, etc., can be solved by using a plurality of LPWA connections at the same time. LPWA is broadly classified into cellular LPWA and non-cellular LPWA. One advantage of cellular LPWA is that the volume of data that can be transferred is higher compared to non-cellular LPWA, since it uses a frequency band assigned by a cellular carrier (licensed band). On the other hand, one advantage of non-cellular LPWA is that a license is not required, which means appliance manufacturers can spearhead establishing stations, making it easier to manage the area of coverage. Using at least one LPWA connection in addition to a Wi-Fi connection ensures the appliance is always connected to a cloud while operating, thereby achieving the "always-connected IoT appliance" status.

Figure 13:
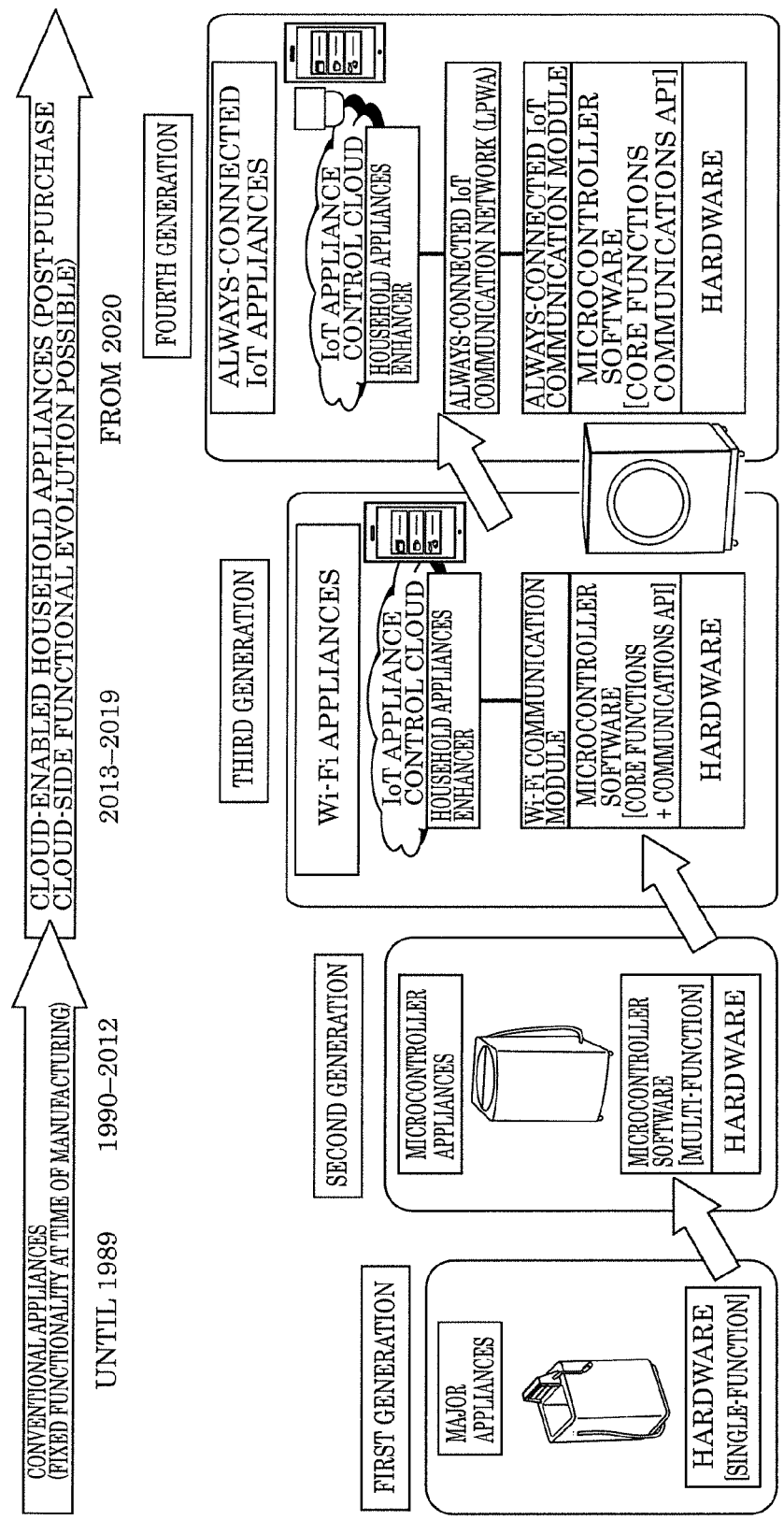
FIG. 13 is a diagram illustrating the evolution of household appliance architecture.

FIG. 13 is a diagram illustrating the evolution of household appliance architecture.

The first generation (before 1990) of household appliances were single-function products configured of mechanical parts such as the compressor and motor, and control logic.

The second generation (up until around 2010) of household appliances were equipped with microcontrollers. Complex control of these household appliances was possible through causing the microcontrollers to execute microcontroller software. Accordingly, the second generation of household appliances were multi-function. However, with the second generation of household appliances, after shipment of the household appliances, it was difficult to update and add functions by updating the microcontroller software.

The third generation (from 2012 and on) of appliances were cloud-enabled appliances equipped with a communication function, such as Wi-Fi and/or Bluetooth, which allowed them to connect to an IoT appliance control cloud through a GW and a broadband network. Accordingly, even after shipment, functions in cloud-enabled appliances could be added or updated by updating the microcontroller software in the appliance from an IoT appliance control cloud and by updating the control mechanism for the appliance cloud-side, without updating the microcontroller software. However, with, for example, Wi-Fi, it is difficult to connect all shipped products, and in many cases, cloud functions cannot be used.

The fourth generation (2020 and after) of appliances are always-connected IoT appliances having an always-connected feature achieved through, for example, LPWA. Accordingly, since all shipped products can be connected, it is believed that all products will be able to use cloud functions.

Figure 14:
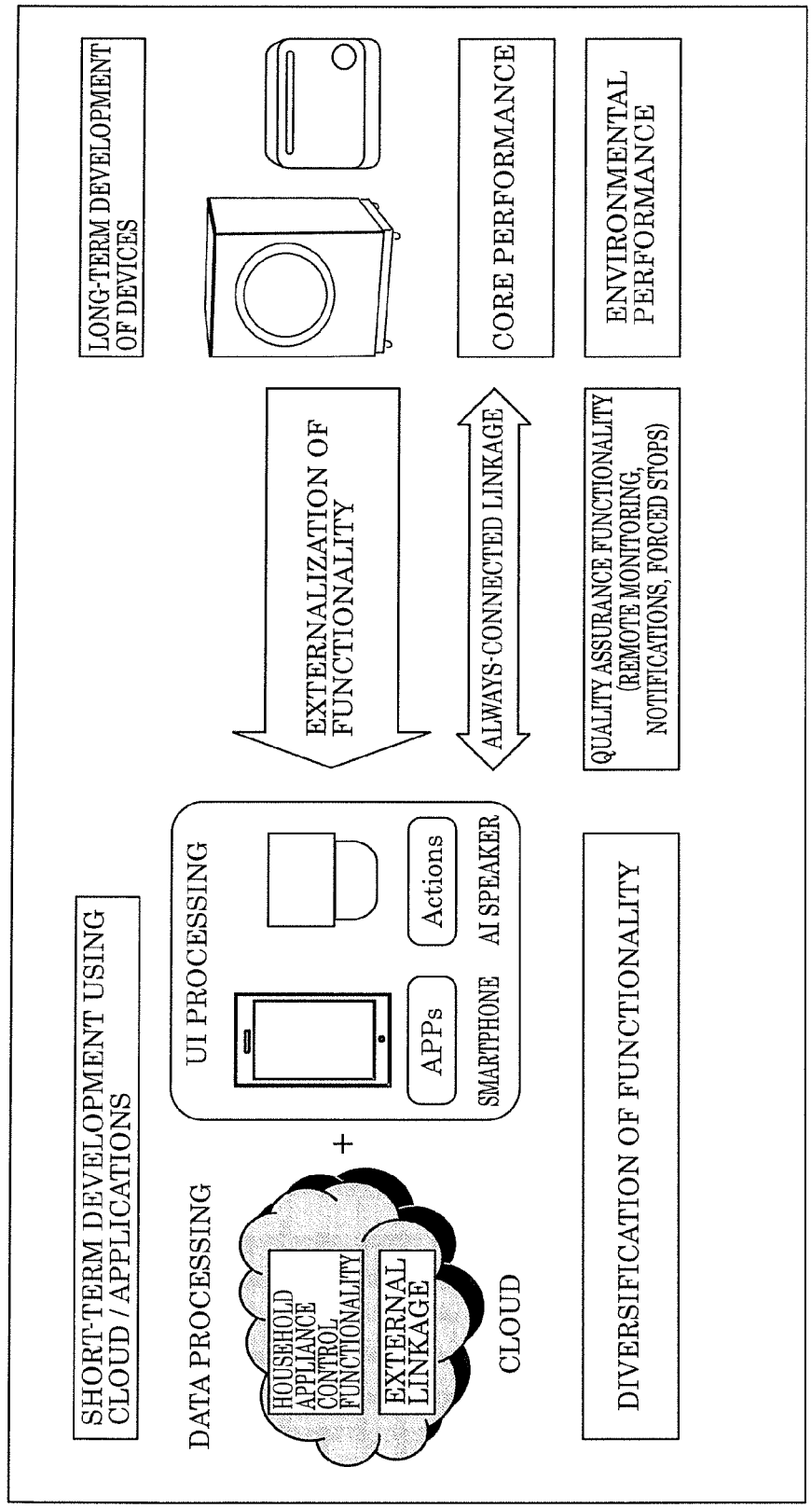
FIG. 14 is a diagram illustrating the division of functions (externalization of functions) in fourth generation household appliances.

FIG. 14 is a diagram illustrating the division of functions (externalization of functions) in fourth generation household appliances.

With fourth generation cloud-enabled household appliances (major appliances such as washing machines and refrigerators; air conditioners; and humidifying air purifiers), by a cloud (server) and a UI device such as a smartphone being always connected, it is possible to divide functions among the cloud, the smartphone, and a device such as a household appliance (i.e., it is possible to externalize functions). Accordingly, even after shipment of the device, the functions and performance of the household appliance can be improved by updating and/or adding functions cloud-side.

Moreover, with fourth generation cloud-enabled household appliances, since it is easy for all shipped products to be always-connected, remote monitoring and remote control of all products after shipment is also possible. Accordingly, vastly improved quality assurance functionality is anticipated. Moreover, even if a product is unfortunately recalled or the like, since the device is connected to a cloud even after shipment, the device can be traced via the cloud, making it possible to, for example, announce the malfunction of a recalled product and/or force it to shut down. This will significantly reduce costs associated with product recall.

Next, device management system 1 according to this embodiment will be described using the configuration illustrated in FIG. 9 as an example.

Figure 15:
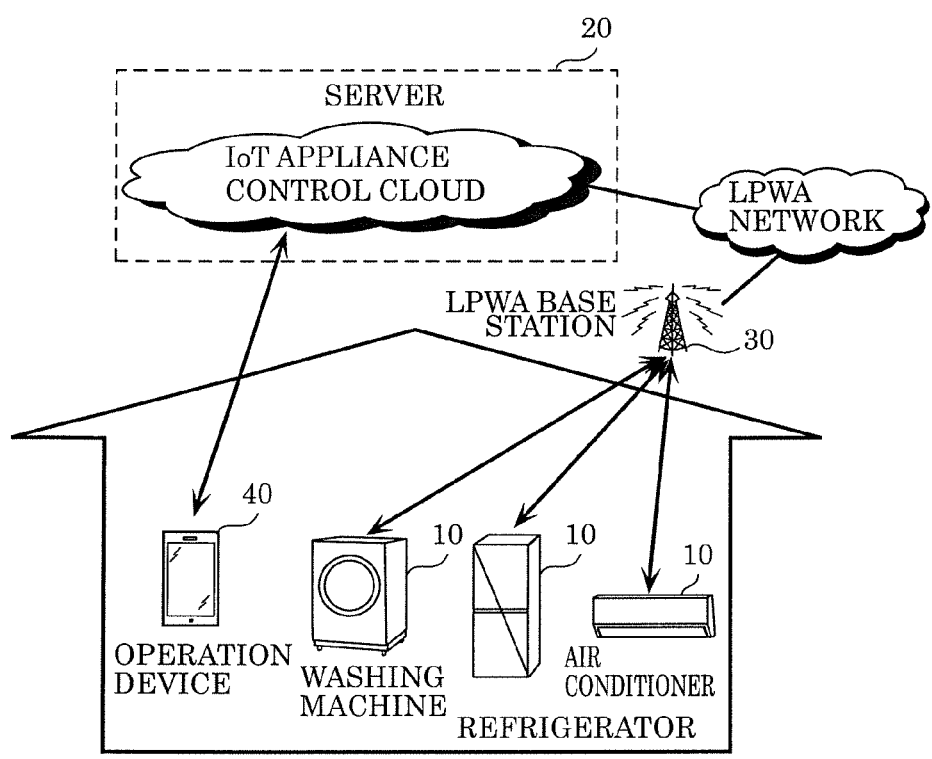
FIG. 15 illustrates a block diagram of a configuration of a device management system.

FIG. 15 illustrates a block diagram of a configuration of a device management system.

As illustrated in FIG. 15, device management system 1 includes server 20, base station 30, and devices 10.

Server 20 is communicatively connected to a network, such as the internet, and functions as an IoT appliance control cloud. Server 20 receives state information from devices 10 via a network, generates notification information in accordance with the received state information, and transmits the generated notification information to devices 10. Functions performed by server 20 will be described in greater detail later.

Base station 30 is, for example, an LPWA base station, and is used in long-distance wireless communication that allows IoT appliances to be always connected to a network. Although only one base station 30 is illustrated in the example in FIG. 15, device management system 1 may include a plurality of base stations 30.

Each device 10 is a fourth generation household appliance described above, that is to say, an always-connected IoT appliance. Moreover, each device 10 communicatively connects to one base station 30 among a plurality of base stations 30. Each device 10 sequentially transmits, to server 20 via the one base station 30, state information indicating a state of the device 10, using an LPWA communication module included in the device 10.

Note that the state information includes, for example, a device unique ID, a communication module ID, a communication module type, a transmission date and time, and a power state. The power state indicates whether device 10 is energized or not, that is to say, whether device 10 is powered-on or powered-off. The state information may additionally include information indicating software version. With this, server 20 can more accurately manage what kind of states each device 10 is operating in.

Next, upon sequentially receiving the state information, base station 30 sequentially transmits, to server 20, unique information which is unique to base station 30, together with the sequentially received state information. Here, upon base station 30 forwarding the state information, the unique information transmitted together with the state information may be a base station ID that identifies the base station, and alternatively, may be position information indicating the position of the base station.

Devices 10 according to this embodiment can transmit their state information to server 20 at regular intervals, for example. Accordingly, server 20 can obtain the most recent state information for devices 10, and can thus efficiently manage devices 10.

Next, the configuration of device 10 and the configuration of server 20 will be described.

Figure 16:
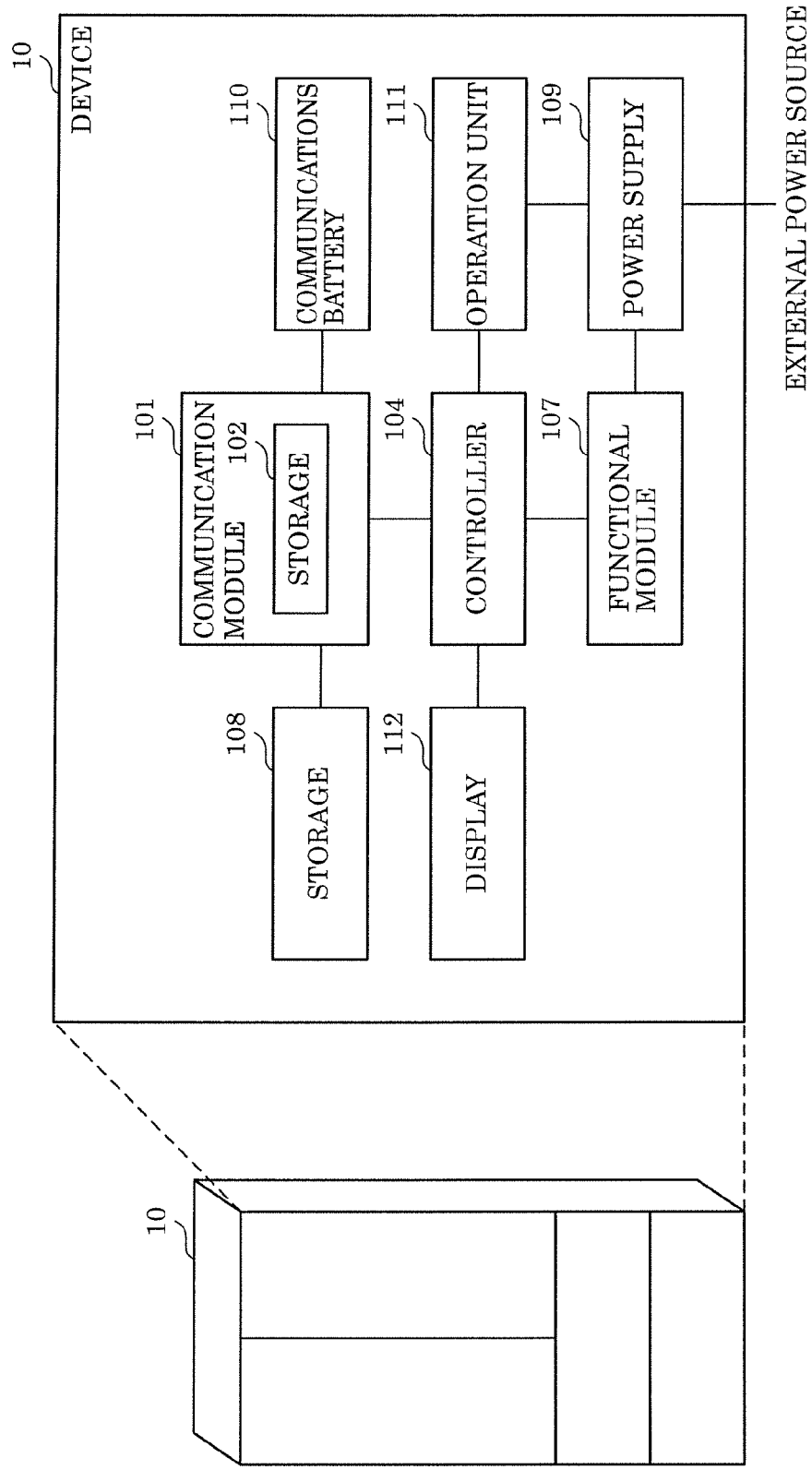
FIG. 16 illustrates a block diagram of a first example of a device that is an IoT appliance.

FIG. 16 illustrates a block diagram of a first example of device 10, which is an IoT appliance.

As illustrated in FIG. 16, device 10 includes communication module 101, controller 104, functional module 107, storage 108, power supply 109, communications battery 110, operation unit 111, and display 112.

Communication module 101 connects to server 20 that manages device 10 through a specific network. Communication module 101 is, for example, a communication module for performing long-distance wireless communication, such as an LPWA communication module. Note that communication module 101 may include a communication module that performs, among the three methods of LPWA and Wi-Fi described with reference to FIG. 8, communication through at least one method of LPWA. In other words, communication module 101 may include a plurality of communication modules that respectively perform communication through different methods of LPWA, and may include a plurality of communication modules that respectively perform communication through LPWA and Wi-Fi. Communication module 101 includes storage 102 that stores the module ID of the communication module. When communication module 101 includes a plurality of communication modules that use different communication methods, storage 102 stores module IDs for each of the plurality of communication modules.

Controller 104 controls operation of device 10 when device 10 is powered-on. Specifically, controller 104 controls operation of device 10 by controlling functional module 107. Moreover, controller 104 may generate state information for device 10, and transmit the generated state information to server 20 using communication module 101. Specifically, controller 104 may obtain the power state indicating whether power supply 109 in device 10 is powered-on or powered-off to generate state information including the power state, and may generate state information including function information indicating the function fulfilled by functional module 107. The state information generated by controller 104 may include the device unique ID, the communication module ID, the communication module type, the transmission date and time, etc., described above. Moreover, controller 104 may cause display 112 to display an image based on the information received from server 20 via communication module 101.

Functional module 107 is a module that fulfills a function of device 10.

Storage 108 is a storage device that stores the unique ID of each device 10. Note that hereinafter, the transmission of state information to server 20 may be referred to as the notification of state information.

Power supply 109 receives power from an external power source, and supplies power to each component in device 10.

Communications battery 110 is a battery that supplies power to, for example, communication module 101, to drive, for example, communication module 101. Communications battery 110 may be a primary cell or a secondary cell. With this, even when device 10 is powered-off, communication module 101 can transmit state information to server 20 via base station 30. In other words, since communication module 101 can communicate with base station 30 regardless of whether the power state of device 10 is off or on, communication module 101 can, at any time, transmit state information to server 20.

Operation unit 111 is an input device that receives an operation input made by a user to operate device 10. When device 10 has a door or lid that opens and closes, like on a refrigerator, microwave oven, or rice cooker, operation unit 111 may be the door or lid.

Display 112 is a display device that displays a variety of information as images.

Next, the configuration of device 10 will be described in greater detail, using a refrigerator as an example.

Even though device 10, exemplified here as a refrigerator, is connected to a network as an IoT device, device 10 is still used as an appliance. Accordingly, device 10 includes a variety of modules for realizing its original functionality as an appliance. In the example of a refrigerator, these modules include, for example, the compressor for cooling the inside of the refrigerator, lighting for illuminating the inside of the refrigerator when the door is opened, and a sensor for measuring the inside temperature or humidity. Each of these modules corresponds to functional module 107. Moreover, large appliances such as refrigerators or air conditioners typically connect to an external power source via power supply 109.

Moreover, recent appliances are typically equipped with controller 104 using a microcomputer or processor, to control various convenient functions. In the example of a refrigerator that includes an ice-making function, a sensor provided in a specialized tray for storing the ice senses the presence or absence of ice and performs operations for making new ice accordingly. In order to carry out such precise operations, control is performed via a microcomputer or processor and software executed by the microcomputer or processor.

Furthermore, device 10 includes display 112 for presenting various information to the user, or operation unit 111 for the user to make complex operational inputs.

Displays included in conventional devices use limited methods to create displays via lamps or a few numeral digits, and only display the minimum amount of required information, such as indication of an error or indication that the power is on or off. Moreover, conventional devices are characterized by simple operations performed using only a few buttons, such as instructing quick freezing or a reset operation for when there is an error.

In contrast, device 10 includes a small touch panel display functioning as operation unit 111 and display 112, making it possible to display more complex states and configure multiple settings.

The component that gives device 10 its IoT appliance characteristics is communication module 101. Communication module 101 enables connection to the internet using one or more schemes from among the various means of communication, such as Wi-Fi or LTE. If device 10 includes a plurality of communication modules, each communication module may be assigned with a separate communication module ID. Depending on the communication method used, the communication module ID functions as a communications identifier like a telephone number does in LTE, for example. By connecting to the internet, various information collected by controller 104 can be transmitted to server 20, and, conversely, information required for controlling device 10 can be obtained from server 20. Furthermore, a technology known as LPWA has emerged in recent years. Although transmission speed is low with LPWA, network connection is possible with little power consumption. By equipping device 10 with an internal communications battery 110 aside from the external power supply, a minimum level of communication is possible with LPWA even when device 10 is not connected to an external power supply. Moreover, depending on the type of communication, it may be necessary to specify a particular appliance when carrying out control, so device 10 is also expected to include storage 108 that stores a unique ID of device 10. Note that there may be a device 10 that does not include communications battery 110.

Figure 17:
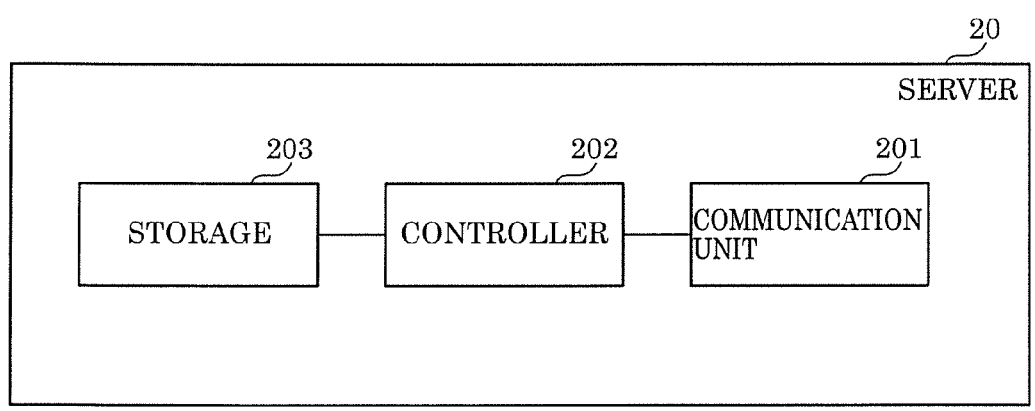
FIG. 17 illustrates a block diagram of a server that is an IoT appliance control cloud.

FIG. 17 illustrates a block diagram of server 20, which is an IoT appliance control cloud.

As illustrated in FIG. 17, server 20 includes communication unit 201, controller 202, and storage 203.

Communication unit 201 sequentially receives the state information and unique information sequentially transmitted by device 10, by communicatively connecting to a network such as the internet. Communication unit 201 may transmit a processing result of controller 202 to device 10 or operation device 40 via a network and base station 30.

Controller 202 sequentially stores, in storage 203, in association with each other, the state information and unique information that are sequentially received at a corresponding time by communication unit 201. Controller 202 may transmit, to device 10 or operation device 40 via communication unit 201, a processing result of processing using the state information or the unique information stored in storage 203, by executing a predetermined program.

Controller 202 is implemented as nonvolatile memory that stores a predetermined program and a processor that executes the predetermined program. Controller 202 may be implemented as a dedicated circuit that implements the above functions.

Storage 203 stores the state information and the unique information received by communication unit 201. Storage 203 may store the processing result of controller 202. Storage 203 is implemented as, for example, a hard disk drive (HDD) or solid state drive (SSD).

Next, state information that is transmitted when device 10 is manufactured or repaired will be described.

Figure 18:
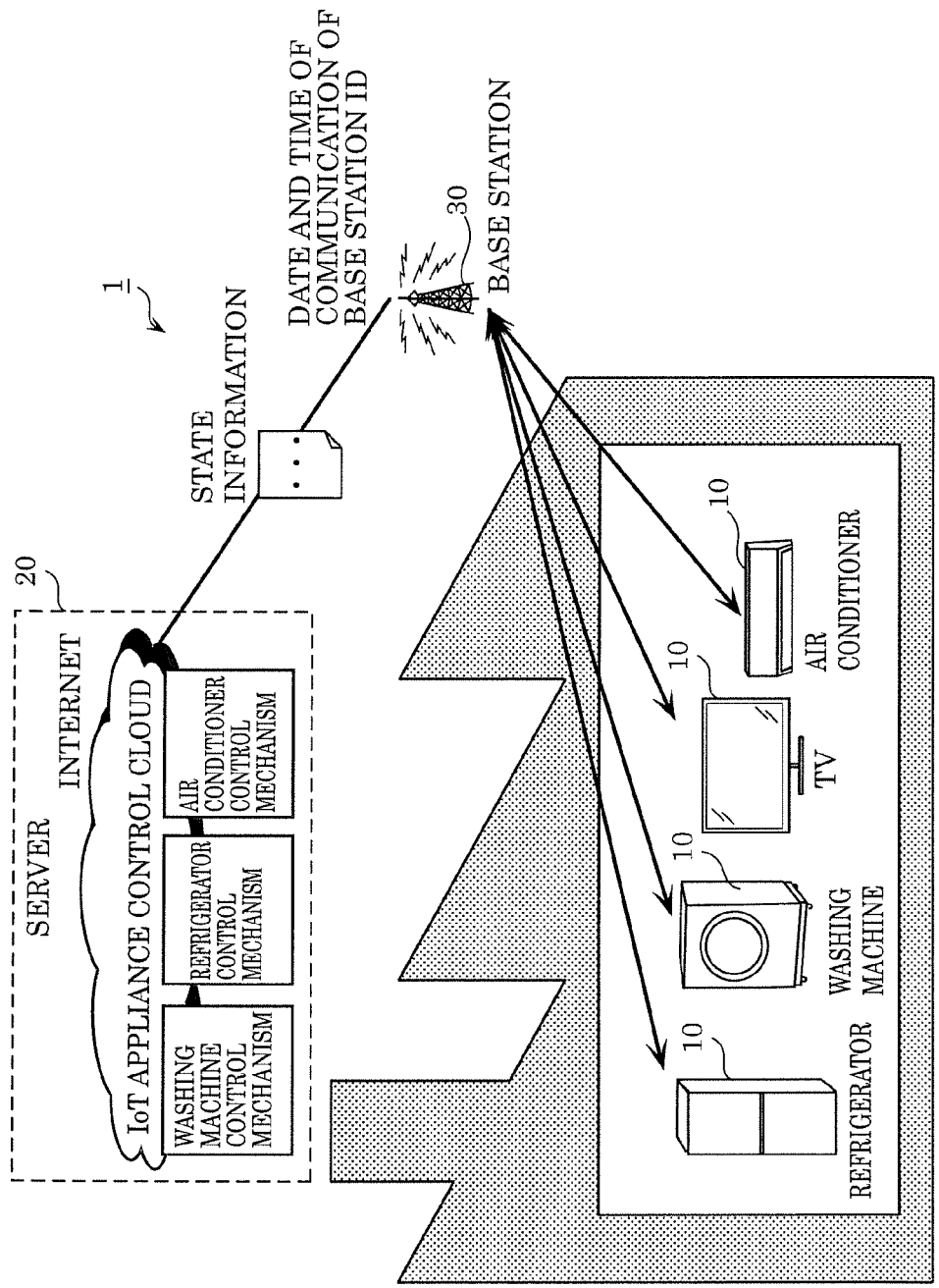
FIG. 18 illustrates one example of the flow of processes for notifying a server of state information, performed in devices including a function for notifying information at the time of manufacture or repair.

FIG. 18 illustrates one example of the flow of processes for notifying server 20 of state information, performed in devices 10 including a function for notifying information at the time of manufacture or repair. FIG. 19 is a table illustrating one example of the state information that is transmitted to server 20 by devices 10 at the time of manufacture or repair.

As described above with reference to FIG. 16, devices 10 transmit state information to server 20 by connecting to a network via base station 30. For example, devices 10 transmit information generated at the time of manufacture or repair as the state information. With this, server 20 can accumulate the received information and manage devices 10 using the accumulated information to ensure quality in all stages of the product life cycle of each device 10.

For example, such devices 10 may transmit, to server 20, a base station ID of the base station used to initially establish communication, as information indicating the manufacturing plant. Moreover, devices 10 may transmit, to server 20, the date and time of the initial establishment of communication, as information indicating the date and time of manufacture. Devices 10 may include these items of information in the state information and transmit the state information to server 20. Note that devices 10 need not transmit the base station ID; base station 30 may add its base station ID to the state information received from devices 10, and transmit the state information added with the base station ID to server 20. Server 20 can calculate the amount of time that has elapsed from the date of manufacture of each device 10, across all stages of the product life cycle, by storing the above-described information transmitted by devices 10 as manufacturing information. Moreover, server 20 can store the manufacturing plant and date of manufacture of devices 10.

Based on this information, server 20 can easily identify the manufacturing plant of a recalled device 10 and easily identify when a recalled device 10 was manufactured in the manufacturing plant. Accordingly, even after shipment of the devices, server 20 can identify a plurality of devices that have been recalled, by narrowing down the manufacturing plant and the above-described period. It is therefore possible for server 20 to notify a recalled device 10 or notify the user's operation device 40 of the recall of the device 10.

Moreover, since server 20 calculates the amount of time that has elapsed since the date of manufacture of device 10, if the designed service life of device 10 expires, the user can be notified by transmitting information indicating that device 10 has exceeded its designed service life to, for example, device 10 or operation device 40. This makes it possible to prevent accidents from occurring.

If device 10 is repaired, device 10 may transmit, for example, the base station ID of base station 30 that device 10 first establishes communication with after being repaired, to server 20 as information indicating the repair shop. Moreover, devices 10 may transmit, to server 20, the date and time of the first establishment of communication after being repaired, as information indicating the date and time of repair. Devices 10 may include these items of information in the state information and transmit the state information to server 20. Server 20 can manage a repair history by storing the above-described information transmitted by devices 10 as repair information.

As illustrated in FIG. 19, devices 10 may transmit, as the manufacturing information, information indicating the manufacturing plant and information indicating the date and time of manufacture to server 20 at the time of the initial establishment of communication. Moreover, devices 10 may transmit, as the repair information, information indicating the repair shop and information indicating the date and time of repair to server 20 at the time communication is established after being repaired. Note that by transmitting information indicating that a device 10 to be repaired by a worker at a repair shop is either in the process of being repaired or has been repaired, along with the device ID of the device 10, to server 20, server 20 can be notified that the device 10 is in the process of being repaired or has been repaired.

Note that device 10 may store state information including the transmitted manufacturing information and/or repair information. With this, the user can know the manufacturing information and/or repair information for device 10 even when device 10 has not established communication with a network, and moreover, when device 10 does establish communication with a network, device 10 can transmit the manufacturing information and/or repair information to server 20.

Next, processes performed by server 20 upon receiving notification of a power state from device 10 will be described.

Each device 10 notifies server 20 of, for example, power information indicating whether device 10 is powered-on or powered-off. With this, server 20 can estimate the placement state of device 10 and can use this information in the control of the communication function of device 10. Server 20 sends a notification in accordance with the result of the estimation to the user. This improves the quality of services provided.

Figure 20:
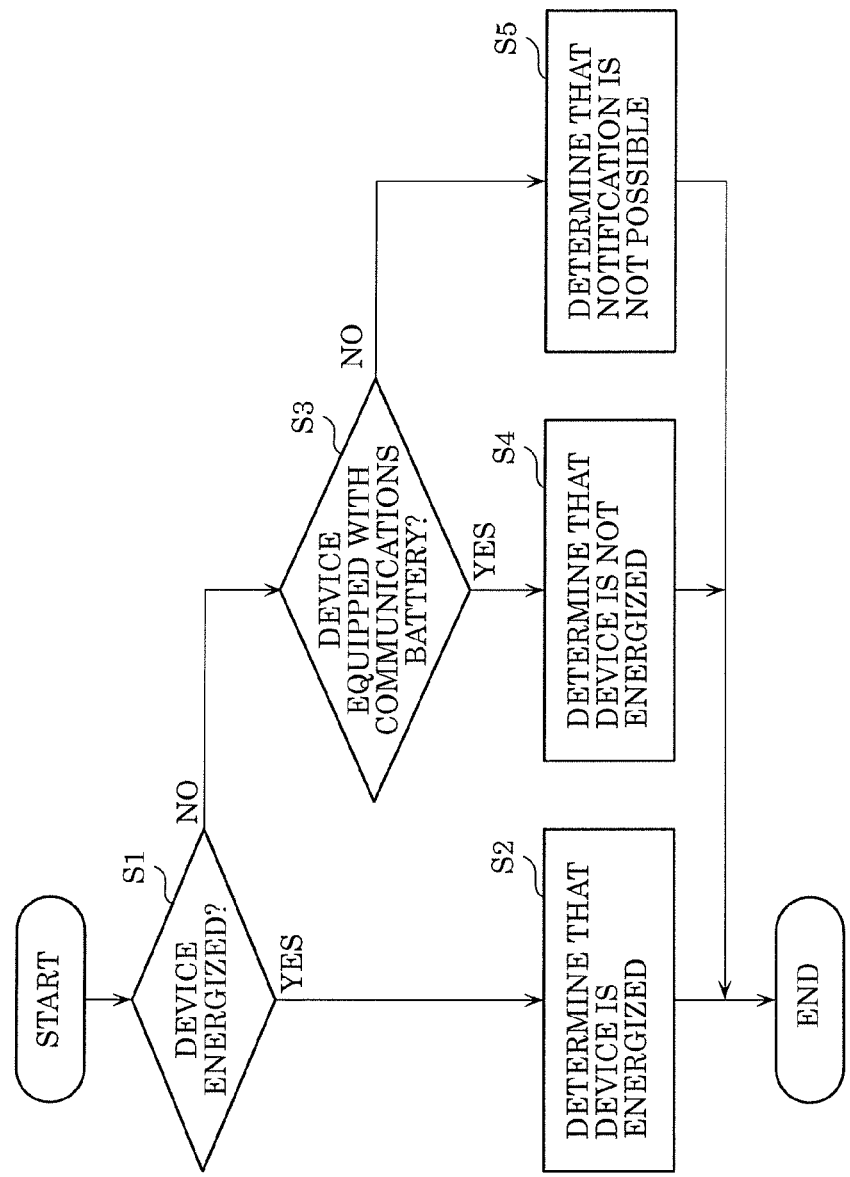
FIG. 20 is a flowchart of a first example of processes for determining the power state of a device performed in a server.

FIG. 20 is a flowchart of a first example of processes for determining the power state of device 10 performed in server 20.

Server 20 sequentially receives state information including a power state from device 10 via base station 30.

Server 20 uses the received state information to determine the power state of device 10, that is, to determine whether device 10 is powered-on or powered-off (S1).

When the power state included in the state information indicates that device 10 is powered-on (yes in S1), server 20 determines that device 10 is energized, that is to say, that device 10 is powered-on (S2).

When the power state included in the state information indicates that device 10 is powered-off (no in S1), server 20 determines whether device 10 is equipped with communications battery 110 or not (S3). Note that the state information may include battery information indicating whether device 10 is equipped with communications battery 110 or not, and server 20 may perform the determination of step S3 based on the battery information. Moreover, server 20 may perform the determination of step S3 by referring to device information about device 10 from an external device, using the device ID.

When server 20 determines that device 10 is equipped with communications battery 110 (yes in S3), server 20 determines that device 10 is not energized, that is to say, that device 10 is powered-off (S4).

When server 20 determines that device 10 is not equipped with communications battery 110 (no in S3), server 20 determines that device 10 is powered-off and is in a state in which device 10 cannot transmit notifications (S5).

In this way, it is possible for server 20 to estimate the placement state of device 10, using the state information transmitted by device 10 including a function for notifying the power state. For example, when server 20 determines that device 10 is energized, like in step S2, it can be concluded that device 10 is at least in a state in which it can be used immediately, such as it is being used for testing in the plant, being used for display purposes in a store, or being used in the home of a user.

On the other hand, when server 20 determines that device 10 is not energized, like in step S4, it can be concluded that device 10 is not in a state in which it can be used immediately, such as before device 10 is shipped, while device 10 is in transport, or before device 10 is placed for use. Accordingly, by server 20 inhibiting the communication volume by reducing the amount of information communicated or by transmitting a control signal that reduces the frequency of communication to device 10 via base station 30, in cases in which device 10 is equipped with communications battery 110, device 10 can reduce power consumption of communications battery 110.

Note that server 20 can more accurately estimate the state of device 10 by performing the determination on not only the most recent notified information, but the previous or older items of information as well.

Figure 21:
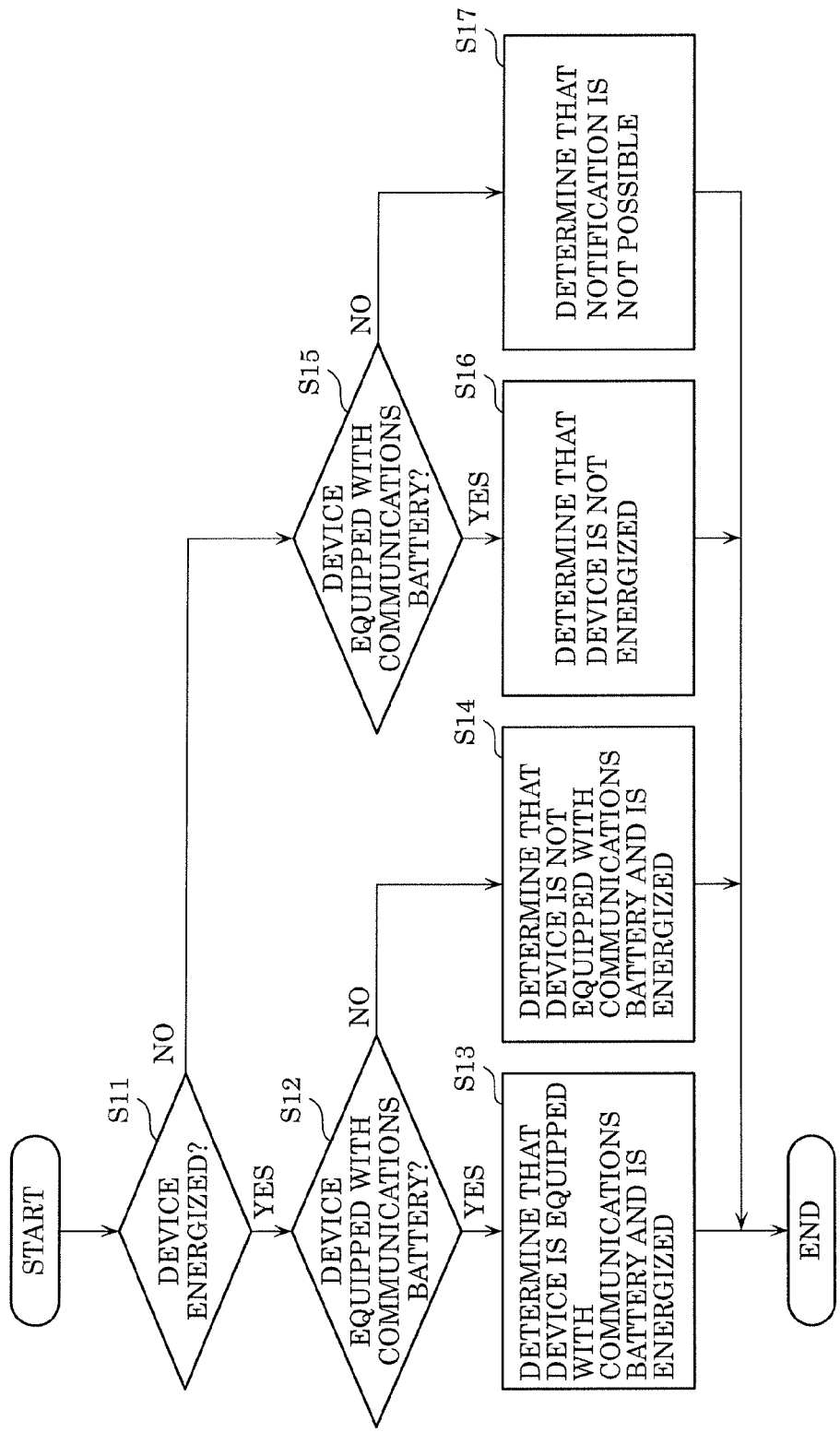
FIG. 21 is a flowchart of a second example of processes for determining the power state of a device performed in a server.

FIG. 21 is a flowchart of a second example of processes for determining the power state of device 10 performed in server 20.

Just like in the first example, server 20 sequentially receives state information including a power state from device 10 via base station 30.

Server 20 uses the received state information to determine the power state of device 10, that is, to determine whether device 10 is powered-on or powered-off (S11).

When the power state included in the state information indicates that device 10 is powered-on (yes in S11), server 20 determines whether device 10 is equipped with communications battery 110 or not (S12).

When server 20 determines that device 10 is equipped with communications battery 110 (yes in S12), server 20 determines that device 10 is equipped with communications battery 110 and is energized, that is to say, is powered-on (S13).

When server 20 determines that device 10 is not equipped with communications battery 110 (no in S12), server 20 determines that device 10 not equipped with communications battery 110 and is energized, that is to say, is powered-on (S14).

When the power state included in the state information indicates that device 10 is powered-off (no in S11), server 20 determines whether device 10 is equipped with communications battery 110 or not (S15).

When server 20 determines that device 10 is equipped with communications battery 110 (yes in S15), server 20 determines that device 10 is equipped with communications battery 110 and is not energized, that is to say, is powered-off (S16).

When server 20 determines that device 10 is not equipped with communications battery 110 (no in S15), server 20 determines that device 10 not equipped with communications battery 110 and is not energized, that is to say, is in a state in which device 10 cannot transmit notifications (S17).

Note that the determinations performed in steps S12 and S15 are performed in the same manner as step S3.

In this way, it is possible for server 20 to estimate the placement state of device 10 and/or a communication malfunction in device 10, using the state information transmitted by device 10 including a function for notifying the power state and the battery information. For example, server 20 can, for a device 10 that is equipped with communications battery 110 and is in an energized state, estimate that the device 10 is at least in a state in which it can be used immediately, and moreover, can be expected to carry out continuous communication. Accordingly, when communication from that device 10 is interrupted, server 20 can estimate that device 10 is experiencing some sort of malfunction. Moreover, server 20 can, for a device 10 that is not equipped with communications battery 110 and is in an energized state, estimate that it is necessary to monitor subsequent progress. This is because it is conceivable that the supply of power from an external power source to device 10 could be interrupted, for example, the power cord of device 10 could become unplugged or the circuit breaker could be tripped, resulting in an interruption of communication, so it can't be said conclusively that there is a malfunction in device 10 or the communication channel.

Note that when device 10 is equipped with communications battery 110, device 10 may notify the amount of energy remaining in communications battery 110 in the state information. With this, server 20 can further anticipate and detect communications battery 110 in communication module 101 being drained of energy.

Note that server 20 can more accurately estimate the state of device 10 by performing the determination on not only the most recent notified information, but the previous or older items of information as well.

Next, processes performed by server 20 upon receiving classification information indicating the type of appliance from the device will be described.

Device 10 may further notify server 20 with classification information indicating the type of device 10 (appliance). With this, server 20 can further increase the accuracy of the estimation of the state of device 10. Server 20 can notify the user by notifying device 10 or operation device 40 with information in accordance with the result of the estimation, which improves the quality of services provided.

Examples of types of appliances indicated by the classification information include "large IoT appliance", "medium sized IoT appliance", and "small IoT appliance". In other words, each device 10 is classified as either a large IoT appliance, a medium sized IoT appliance, or a small IoT appliance.

A large IoT appliance is an IoT appliance that requires installation, such as a dish washer, a built-in induction stove, or an interphone. A medium sized IoT appliance is an IoT appliance that does not require installation, but is not anticipated to be carried around, such as a television or refrigerator. A small IoT appliance is an IoT appliance that does not require installation, and is anticipated to be carried around, such as a hair dryer or electric shaver.

Figure 22:
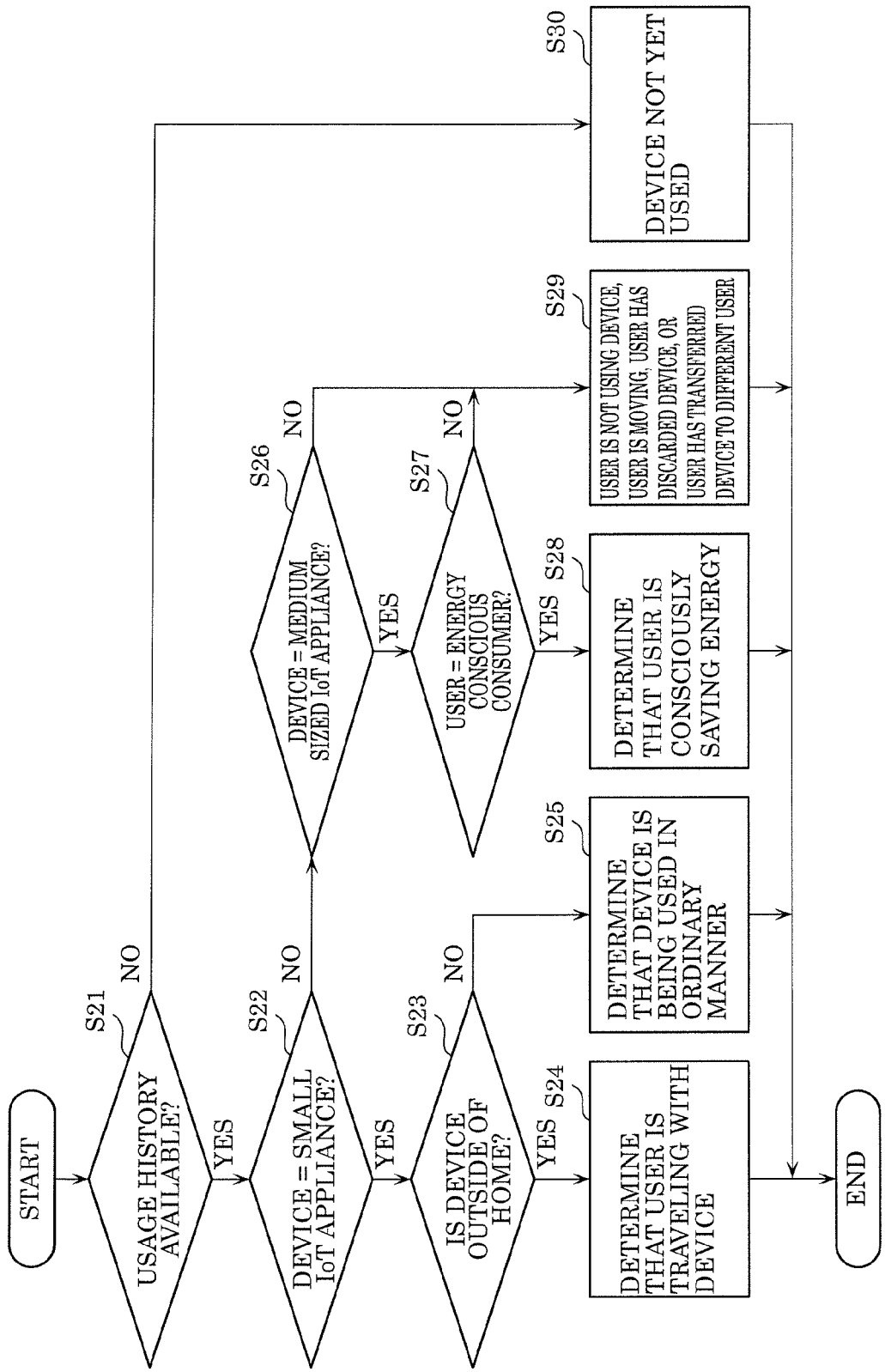
FIG. 22 is a flowchart of an example of processes performed by a server for estimating the placement state of a device that is not in an energized state.

FIG. 22 is a flowchart of an example of processes performed by server 20 for estimating the placement state of a device 10 that is not in an energized state.

For example, in the processes illustrated in FIG. 20 or FIG. 21, when server 20 determines that device 10 is not in an energized state, regardless of whether device 10 is equipped with communications battery 110 or not, server 20 performs the following processes.

Server 20 determines whether there is a usage history for device 10 or not (S21). For example, when the state information for a device 10 that is stored in storage 203 does not include state information indicating the device 10 is powered-on, server 20 determines that there is no usage history for the device 10, and when the state information for a device 10 that is stored in storage 203 includes state information indicating the device 10 is powered-on, server 20 determines that there is a usage history for the device 10.

When server 20 determines that there is a usage history for device 10 (yes in S21), server 20 determines whether the device 10 is a small IoT appliance or not (S22).

When server 20 determines that device 10 is a small IoT appliance (yes in S22), server 20 determines whether the device 10 is outside of the home or not (S23). For example, server 20 determines whether the device 10 is outside of the home or not by determining whether the base station ID of base station 30 received together with the state information for the device 10 matches the base station ID of a base station 30 in the surrounding area of the user's home. Note that whether the base station ID matches the base station ID of a base station 30 in the surrounding area of the user's home or not can be determined since server 20 is notified of the base station ID of a base station 30 in the surrounding area of the user's home together with the state information, as a result of causing device 10 to transmit to server 20 information indicating that device 10 has been placed in the home of the user, at the time of being placed in the home. Server 20 can perform the determination of step S23 by storing, as the base station ID of a base station in the surrounding area of the user's home, the base station ID received together with the information indicating that device 10 has been placed in the home of the user.

When server 20 determines that device 10 is outside of the home (yes in S23), server 20 determines that the user is traveling with device 10 (S24).

When server 20 determines that device 10 is inside the home (no in S23), server 20 determines that the user is using device 10 inside the home (i.e., is using device 10 in an ordinary manner) (S25).

When server 20 determines that device 10 is not a small IoT appliance (no in S22), server 20 determines whether device 10 is a medium sized IoT appliance or not (S26).

When server 20 determines that device 10 is a medium sized IoT appliance (yes in S26), server 20 determines whether the user of device 10 is an energy-conscious consumer or not (S27). For example, server 20 may determine whether the user is an energy-conscious consumer or not based on information input in advance by the user, at the time of user registration of device 10. In other words, during user registration, the user may use operation device 40 to make an input indicating whether they are an energy-conscious consumer or not, and operation device 40 may transmit, to server 20, information indicating whether the user is an energy-conscious consumer or not, based on this input.

When server 20 determines that the user is an energy-conscious consumer (yes in S27), server 20 determines that the user is consciously saving energy with regard to device 10 (S28).

When server 20 determines that device 10 is not a medium sized IoT appliance (no in S26) or determines that the user is not an energy-conscious consumer (no in S27), server 20 determines that the user is not using device 10, the user is in the midst of moving to a new residence, the user has discarded device 10, or the user has transferred device 10 to a different user (S29).

When server 20 determines that there is no usage history for device 10 (no in S21), server 20 determines that device 10 has not yet been used (S30).

Next, a method used by server 20 to control the frequency at which device 10 communicates will be described.

Server 20 can estimate the state of device 10 based on the content of a notification or the content of a past notification. Devices 10 include devices that are not constantly energized, such as those that are used limitedly depending on the season, such as a fan. By equipping such a device 10 that is not constantly energized with communications battery 110, the device 10 can notify server 20 with state information even if device 10 is not receiving a supply of power from an external power source. However, if device 10 frequently communicates, the power stored in communications battery 110 will quickly deplete. In other words, if the frequency of communication is appropriately controlled, the life of communications battery 110 can be extended and communication volume can be inhibited.

Figure 23:
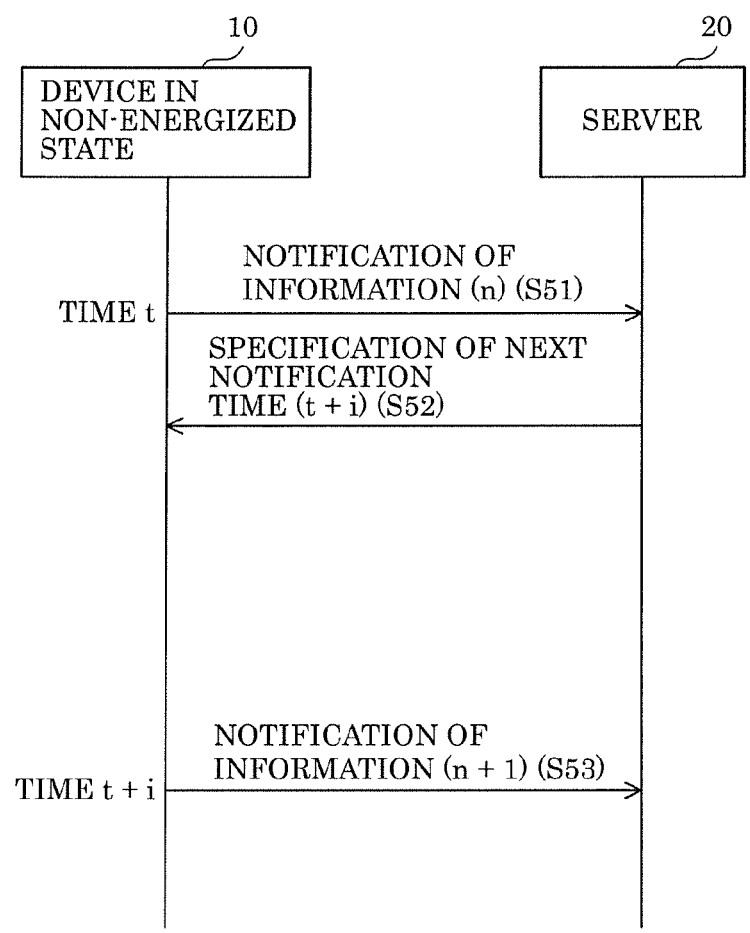
FIG. 23 is a sequence chart illustrating one example of processes performed by a server to control the frequency of communication of a device in a non-energized state.
Figure 24:
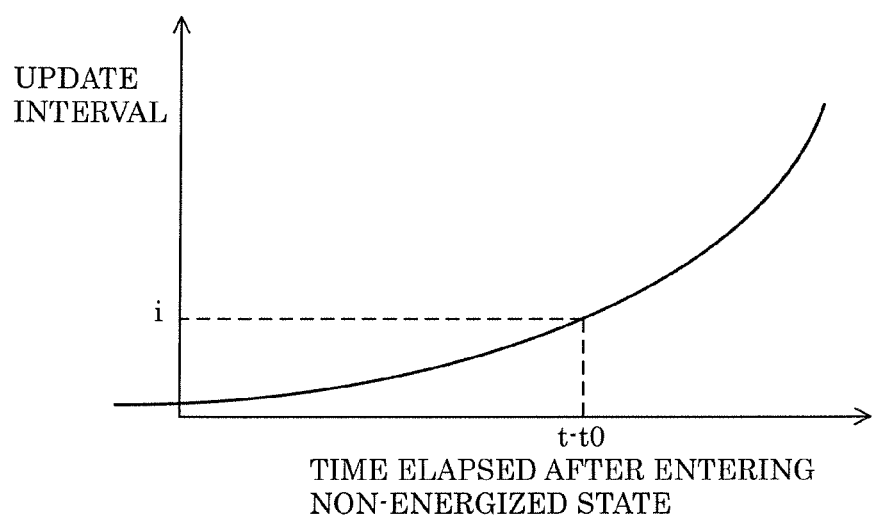
FIG. 24 is a graph illustrating the relationship between the update interval determined by a server and the time elapsed after entering the non-energized state.

FIG. 23 is a sequence chart illustrating one example of processes performed by server 20 to control the frequency of communication of device 10 in a non-energized state. FIG. 24 is a graph illustrating the relationship between the update interval determined by server 20 and the time elapsed after entering the non-energized state.

For example, device 10 enters a non-energized state at time to, and makes an n-th notification of information (n) at time t to server 20 (S51).

Server 20 calculates an update interval (i) in accordance with the graph in FIG. 24 based on the amount of time elapsed since device 10 has entered the non-energized state, and transmits a control signal specifying the next notification time (t+i) as the notification information to device 10 (S52).

Then, device 10 makes an (n+1)-th notification of information (n+1) at the next notification time (t+i) specified in the control signal received in step S52 (S53). Thereafter, step S53 is replaced with step S51, and steps S52 and S53 are repeated.

This makes it possible to keep battery power consumption to a minimum by, for example, partially cutting power when device 10 is not communicating. Moreover, there is a low probability that the notification content will change when device 10 is in a non-energized state. Accordingly, the longer the non-energized state continues, the longer server 20 sets the update interval for the notification of information by device 10. This makes it possible to inhibit the consumption of power stored in communications battery 110 caused by device 10 frequently making the notification of information. Note that when device 10 is in an energized state, device 10 may notify the state information regardless of the specified update time. This makes it possible for server 20 to receive notifications of changed content when the state of device 10 has changed and thus the content of the notification changes.

For example, when device 10 is a device that is used seasonally such as a fan or heater and thus there are periods of time during which device 10 is not energized, server 20 may set the update interval to one day when the amount of time that has elapsed since device 10 entered the non-energized state is no more than five days, may set the update interval to five days when the amount of time that has elapsed since device 10 entered the non-energized state is more than five days and no more than 25 days, and may set the update interval to 25 days when device 10 has been in a non-energized state for more than 25 days. With this, since the update interval increases as the duration of the non-energized state increases, it possible to inhibit the consumption of power stored in communications battery 110.

Moreover, when device 10 is a device that is anticipated to be constantly energized, such as a refrigerator, server 20 can inhibit the consumption of power stored in communications battery 110 by, for example, determining that device 10 is not being used after five days have elapsed since entering a non-energized state and setting the update interval to 25 days.

Moreover, when device 10 is a device that is anticipated to be carried around such as a hair dryer or an electric shaver, server 20 can inhibit the consumption of power stored in communications battery 110 by, for example, setting the update interval to eight hours when the amount of time that has elapsed since device 10 entered a non-energized state is no more than seven days and tracking the position of device 10, and setting the update interval to one day when the amount of time that has elapsed since device 10 entered a non-energized state is more than seven days.

Note that the control of the frequency of communication need not be performed by server 20. For example, device 10 may store the amount of time elapsed since entering a non-energized state, and calculate the next update time based on the amount of time elapsed to control the next update time itself.

Next, device 10A that includes storage 108A which stores notification content will be described. Even if device 10A is in a non-energized state, as a result of including storage 108A, device 10A can make a notification using the minimum amount of required power.

Figure 25:
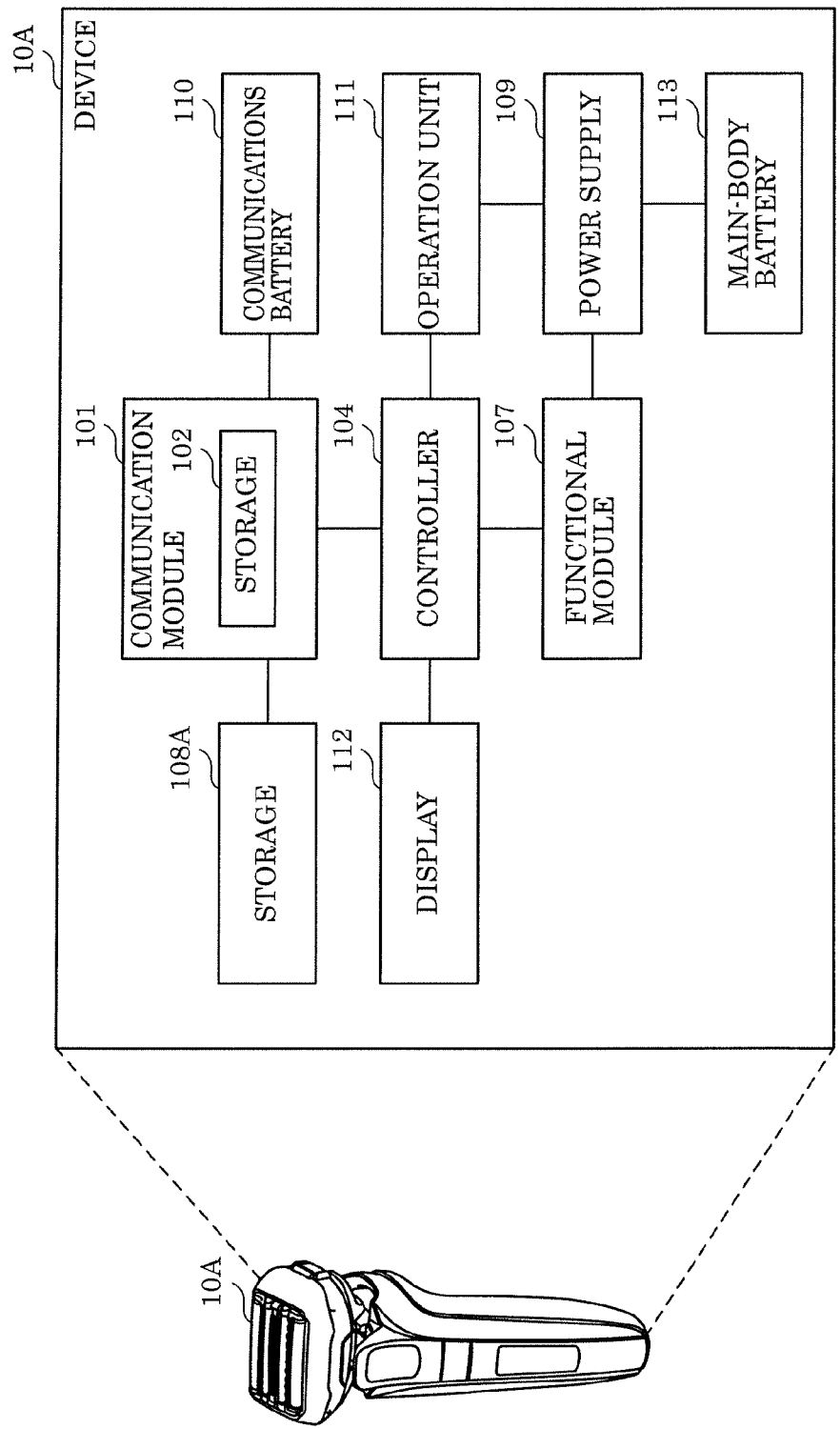
FIG. 25 illustrates a block diagram of a second example of a device that is an IoT appliance.

FIG. 25 illustrates a block diagram of a second example, namely device 10A, which is an IoT appliance.

As illustrated in FIG. 25, device 10A differs from device 10 in that it includes main-body battery 113, and includes storage 108A instead of storage 108.

In this example, controller 104 sequentially stores the control state of controller 104 into storage 108A.

Storage 108A sequentially stores a control state indicating control carried out by controller 104. When the control state is stored in storage 108A, if device 10 is powered-off, communication module 101 may read the control state sequentially stored in storage 108A, and transmit the read control state as state information to server 20 via base station 30.

In this way, device 10A includes storage 108A capable of storing information required for notifying server 20 even when device 10A is in a non-energized state. Accordingly, it is possible to notify server 20 of necessary information even when device 10A is in a non-energized state, without having to supply power throughout device 10A.

For example, battery information about main-body battery 113 in device 10A may be stored somewhere other than communication module 101 that receives a supply of power from communications battery 110. Accordingly, when a configuration that does not include storage 108A is used, in order to obtain the battery information about main-body battery 113, communication module 101 needs to supply power to the block (for example, a storage (not illustrated in the drawings) included in controller 104) that stores the battery information about the main-body battery 113. However, since device 10A includes storage 108A, by copying the battery information about main-body battery 113 to storage 108A when in an energized state, the battery information about main-body battery 113 can be notified to server 20 even when device 10A is in a non-energized state, by supplying power to only communication module 101. Note that in addition to the battery information about main-body battery 113, controller 104 may cause storage 108A to store the control state, and communication module 101 may transmit the control state stored in storage 108A to server 20 as state information.

Note that communication module 101 may reduce communication volume by notifying server 20 of the difference between the content previously notified to server 20 and the current content.

Next, destination information of device 10 will be described. For example, device 10 may notify destination information indicating the destination of device 10. With this, when device 10 is used in a region other than the intended destination, server 20 can automatically configure the settings of device 10 to settings appropriate for the region in which device 10 is placed.

Figure 26:
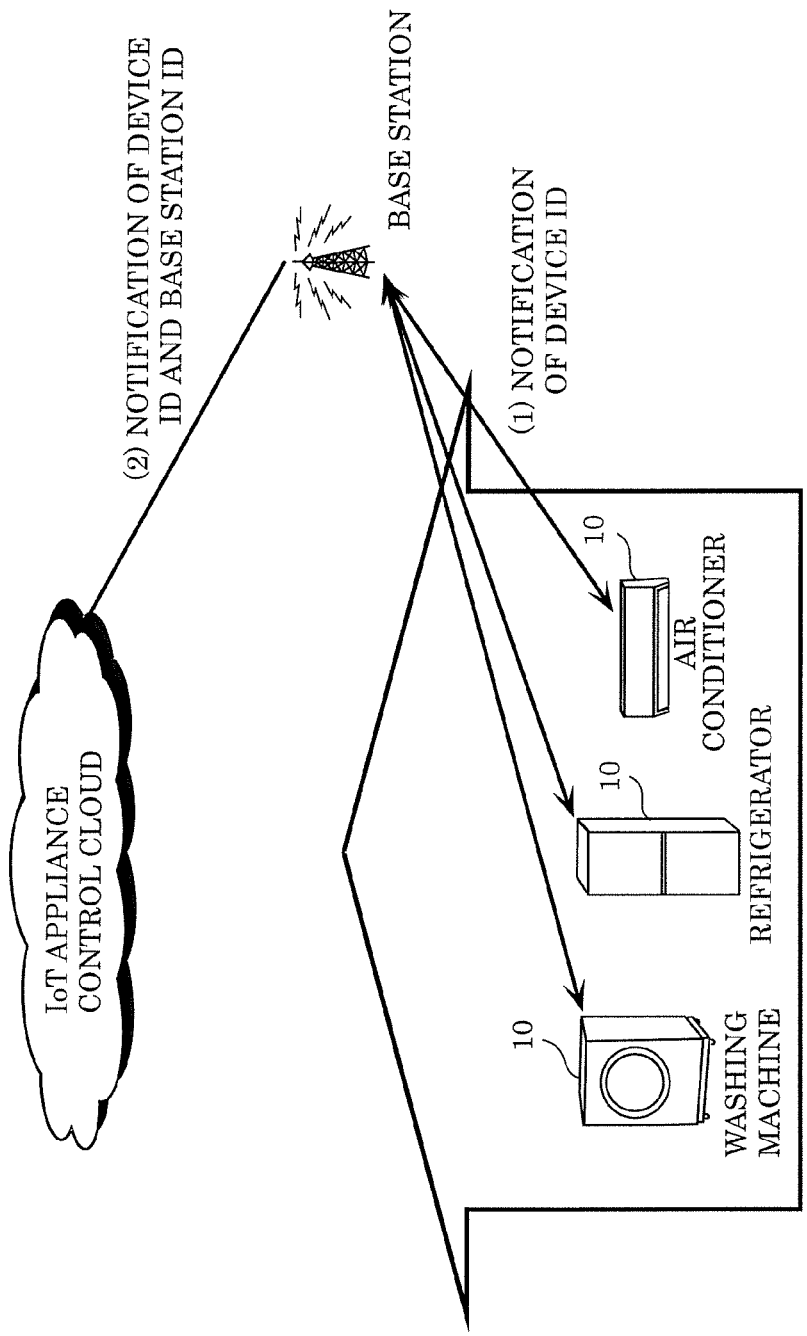
FIG. 26 illustrates an example of a method for obtaining the region in which a device is placed upon usage of the device.

FIG. 26 illustrates an example of a method for obtaining the region in which device 10 is placed upon usage of device 10.

For example, device 10 notifies server 20 with information indicating a destination (supported region) at the time of manufacturing, and server 20 stores this information. Upon device 10 being used by a user, (1) device 10 notifies a nearby base station 30 of the device ID of device 10. Moreover, (2) base station 30 notifies server 20 of the device ID and of information on the base station ID that established the communication.

Based on the notified information, server 20 determines whether the destination (supported region) of device 10 is the same as the region in which device 10 is actually placed or not. When server 20 determines that the destination and the region in which device 10 is actually placed are not the same, server 20 transmits, as notification information, an instruction to cause device 10 to change the configured settings, thereby changing the settings in accordance with the unique characteristics and properties of the region in which device 10 is actually placed. Examples of settings that are changed include language settings for the menu screen, television channel information, AC frequency, water quality, air temperature, humidity level, precipitation amount, etc.

Next, a device 10 including a function for notifying firmware information while stockpiled will be described.

Figure 27:
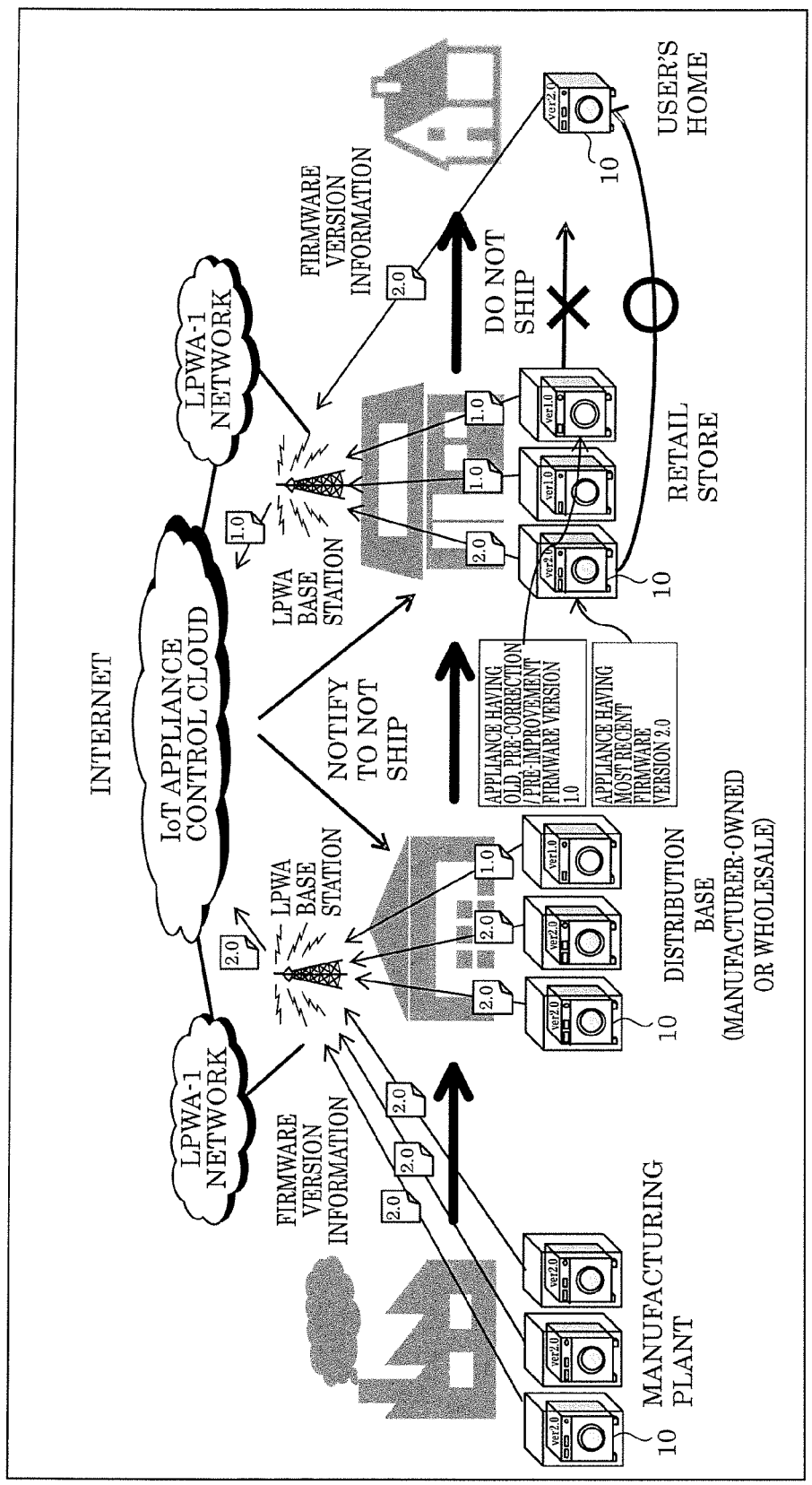
FIG. 27 illustrates an example of notification of firmware version along the distribution channel of devices.

FIG. 27 illustrates an example of notification of firmware version along the distribution channel of device 10.

After being manufactured at the manufacturing plant, appliances pass through a plurality of points before reaching the user's home, such as a manufacturer-owned or wholesale distribution base and a retail store.

Moreover, the firmware of appliances may be updated when a correction or improvement is made as manufacturing and sales progresses. Accordingly, in order to manage information indicating whether the firmware has been changed or not, it is typical that firmware versions are also changed when the firmware is changed.

From both the user's perspective and the appliance manufacturer's perspective, it is desirable that the user purchase and use an appliance whose firmware is up to date with the newest corrected or improved firmware version. However, since appliances may become stockpiled as they pass through the plurality of points after being manufactured, even if a most recent version of an appliance is shipped from the manufacturing plant, by the time it reaches the user's home, there is a possibility that a correction or improvement has been made to the appliance. Accordingly, there are instances in which an appliance that has not received the correction or improvement, that is to say, an appliance whose firmware version has not been changed reaches the user. Moreover, checking and determining the firmware version of stockpiled appliances is troublesome as it creates work for the various points along the distribution channel.

In view of this, device 10 notifies server 20 of firmware information by connecting to a network, even while stockpiled. With this, server 20 can know the position of device 10 since the base station ID of base station 30 that device 10 communicates with is obtained together with the firmware information. Accordingly, server 20 can estimate which firmware version of devices 10 are stockpiled at which point along the distribution channel. Based on this information, server 20 can furthermore notify a terminal at a point along the distribution with notification information of an instruction to not ship out any device 10 having an old firmware version, thereby reducing the occurrence of situations in which a device 10 reaches the user before it is corrected or improved.

Next, processes for linking a user and device 10 in a management service for appliances linked to an e-commerce service will be described.

Figure 28:
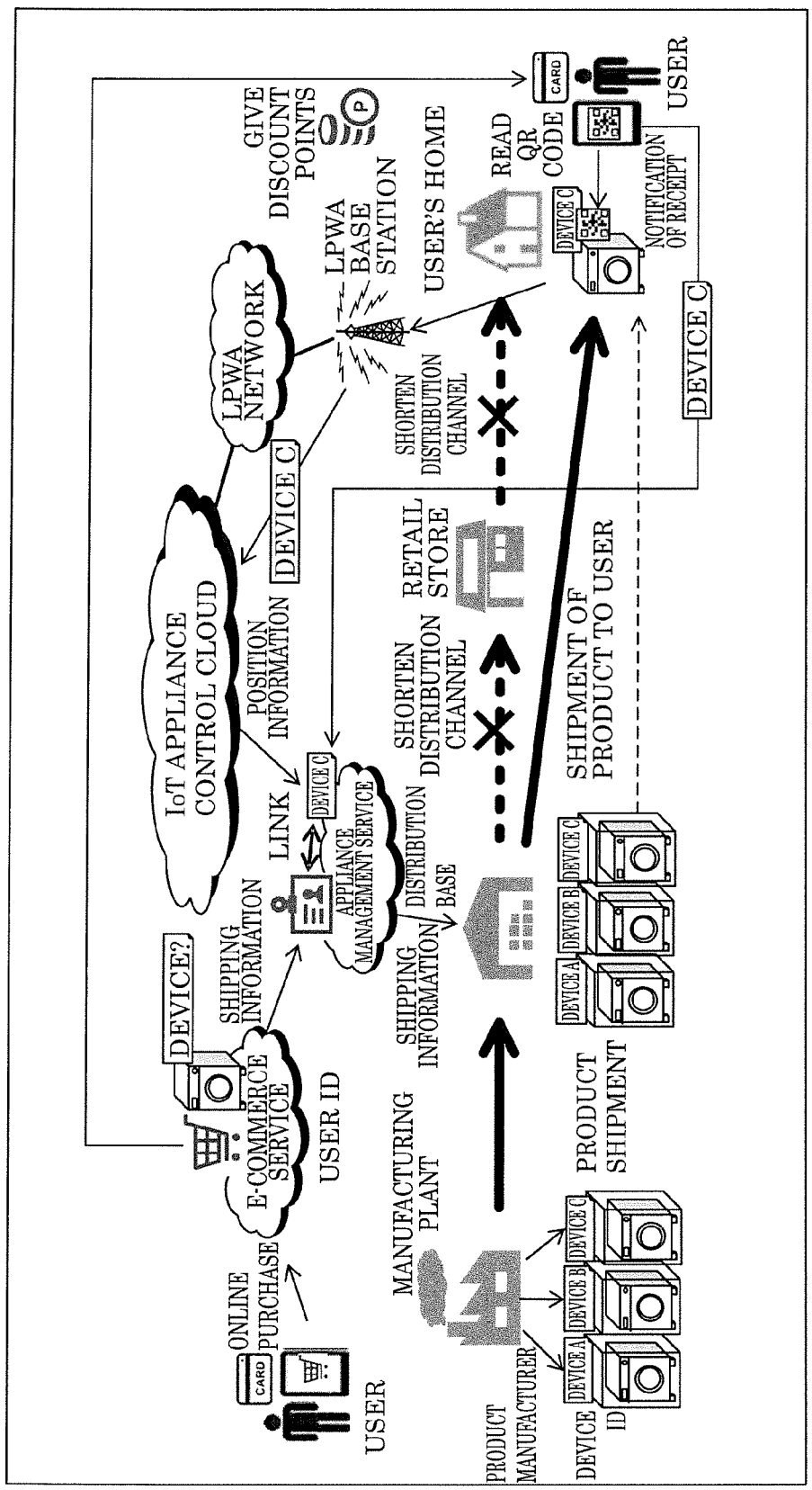
FIG. 28 illustrates processes for linking a user and a device in a management service for appliances linked to an e-commerce service.

FIG. 28 illustrates processes for linking a user and device 10 in a management service for appliances linked to an e-commerce service.

Appliances typically pass through many points along the distribution channel, including a manufacturing plant, a distribution base, a retail store, before reaching the home of the user that purchased the appliance. Appliances are usually embedded with a device ID for individual identification of the device during the manufacturing phase. Moreover, in addition to retail stores, users have increasingly been purchasing appliances online through e-commerce services. It is common for the various e-commerce services to issue an exclusive membership card, and give points, which can be used for a discount, that are commensurate with the purchase price.

On the other hand, with appliance management services, etc., provided by, for example, the appliance manufacturer, it is necessary to link the user and the device ID of the purchased appliance, and register the link. However, since it is difficult to know the device ID of the appliance beforehand or while the appliance is still in the distribution phase, as it currently stands, the user is required to access the service site and register the device ID of the purchased appliance, which causes work for the user. Moreover, there is little advantage to the user even if he or she registers the device ID, leading to the problem that the number of appliances registered by users is not increasing.

In view of this, for example, device 10 notifies server 20 of the device ID, whereby server 20 obtains, together with the device ID, the base station ID of base station 30 that device 10 communicated with. With this, as long as the appliance management service knows the device ID and the position information indicating the position of device 10, the appliance management service and the e-commerce service can be linked to predict user-device linkage by referring to (i) the device ID and the position information known by the appliance management service and (ii) the user ID, purchased appliance information, and shipping information known by the e-commerce service. Moreover, in a state in which the user is logged in to the e-commerce site, it is possible to read, for example, a QR code (registered trademark) containing the appliance ID that is on the purchased appliance with operation device 40, such as a smartphone, and transmit a notification of receipt to the appliance management service along with the user ID for the e-commerce site, to finalize the registration of the user-device link. Moreover, when the user transmits the notification of receipt by operating operation device 40, discount points, etc., for the linked e-commerce service can be given to the user, creating an incentive for the user. This makes it possible to facilitate the user to register a purchased device 10. Note that the funds for the discount points given to the user by the e-commerce service can be recuperated by the costs saved by shortening the distribution channel.

As described above, the embodiments have been described as exemplifications of the technique according to the present disclosure. To this extent, the accompanying drawings and detailed description are provided.

Therefore, the elements described in the accompanying drawings and detailed description may include, not only those essential to solving the technical problems, but also those that are not essential to solving the technical problems but are included in order to illustrate the aforementioned technique. Thus, those unnecessary elements should not be deemed essential due to the mere fact that they are described in the accompanying drawings and the detailed description.

Furthermore, since the foregoing embodiments are for illustrating the technique according to the present disclosure, various changes, substitutions, additions, omissions, etc., can be carried out within the scope of the claims or its equivalents.

INDUSTRIAL APPLICABILITY

The present disclosure is applicable as a device management system which can efficiently manage a device, a device, or a device management method which can efficiently manage a device, etc.

The invention claimed is:

1. A device management method executed in a device management system including a server communicatively connected to a network, a base station for long-distance wireless communication that is communicatively connected to the network, and a device communicatively connected to the base station, the device management method comprising:
    transmitting state information indicating a state of the device to the server via the base station, wherein the device includes:
        a communication module for carrying out the long-distance wireless communication with the base station, wherein the communication module transmits the state information to the server via the base station when the device is powered-off,
        a battery that supplies power to the communication module for operating the communication module,
        a controller that controls operation of the device when the device is powered-on, and
        a storage that sequentially stores a control state indicating control carried out by the controller;
    when the device is powered-off, reading, using the communication module, the control state sequentially stored in the storage when the device is powered-on; and
    transmitting the control state read to the server via the base station, as the state information.

2. A device management system, comprising:
    a server communicatively connected to a network;
    a base station for long-distance wireless communication that is communicatively connected to the network; and
    a device that is communicatively connected to the base station and transmits state information indicating a state of the device to the server via the base station, wherein the device includes:
        a communication module for carrying out the long-distance wireless communication with the base station; and
        a battery that supplies power to the communication module for operating the communication module, and
    the communication module transmits the state information to the server via the base station when the device is powered-off, wherein the device further includes:
        a controller that controls operation of the device when the device is powered-on; and
        a storage that sequentially stores a control state indicating control carried out by the controller, and when the device is powered-off, the communication module reads the control state sequentially stored in the storage when the device is powered-on, and transmits the control state read to the server via the base station, as the state information.

3. The device management system according to claim 2, wherein the communication module transmits the state information to the server via the base station when the device is powered-off using the power supplied by the battery.

4. The device management system according to claim 3, wherein the base station is a low power, wide area (LPWA) base station, and
the communication module is an LPWA communication module.

5. The device management system according to claim 2, wherein the state information includes a power state indicating whether the device is energized or not.

6. The device management system according to claim 2, wherein the server receives the state information from the device, generates notification information in accordance with the state information received, and transmits the notification information generated to the device.

7. A device, comprising:
a communication module communicatively connected to a base station for long-distance wireless communication, the communication module configured to transmit state information indicating a state of the device to a server via the base station, the server communicatively connected to the base station via a network,
a battery that supplies power for operating the communication module,
  wherein the communication module transmits the state information to the server via the base station when the device is powered-off;
a controller that controls operation of the device when the device is powered-on; and
a storage that sequentially stores a control state indicating control carried out by the controller,
  wherein when the device is powered-off, the communication module reads the control state sequentially stored in the storage when the device is powered-on, and transmits the control state read to the server via the base station, as the state information.

8. The device according to claim 7, wherein the communication module transmits the state information to the server via the base station when the device is powered-off using the power supplied by the battery.

9. The device according to claim 7,
wherein the base station is a low power, wide area (LPWA) base station, and
the communication module is an LPWA communication module.

10. The device according to claim 7, wherein the state information includes a power state indicating whether the device is energized or not.

* * * * *